US008842994B2

(12) United States Patent
Lanzone et al.

(10) Patent No.: US 8,842,994 B2

(45) Date of Patent: Sep. 23, 2014

(54) DISTRIBUTING CLOCK SYNCHRONIZATION INFORMATION WITHIN AN OPTICAL COMMUNICATIONS NETWORK

(75) Inventors: Sergio Lanzone, Genoa (IT); Orazio Toscano, Genoa (IT); Stefano Ruffini, Rome (IT)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 206 days.

(21) Appl. No.: 13/592,297

(22) Filed: Aug. 22, 2012

(65) Prior Publication Data

US 2013/0315606 A1 Nov. 28, 2013

(30) Foreign Application Priority Data

May 24, 2012 (EP) .................................... 12169191
Aug. 17, 2012 (EP) .................. PCT/EP2012/066124

(51) Int. Cl.
*H04B 10/00* (2013.01)
*H04J 3/06* (2006.01)
*H04L 7/00* (2006.01)

(52) U.S. Cl.
CPC ............... *H04L 7/0075* (2013.01); *H04J 3/065* (2013.01)
USPC ...... 398/154; 398/155; 370/395.62; 370/509; 370/512

(58) Field of Classification Search
None
See application file for complete search history.

(56) References Cited

U.S. PATENT DOCUMENTS 8,335,437 B2 * 12/2012 Zhao et al. .................... 398/154
8,374,115 B2 * 2/2013 Huang et al. .................. 370/312
2005/0078682 A1 * 4/2005 Kim et al. .................. 370/395.5
2008/0069032 A1 * 3/2008 Liu .............................. 370/328
2009/0067850 A1 * 3/2009 Mizutani et al. .............. 398/154
2010/0040369 A1 * 2/2010 Zhao et al. ...................... 398/58

* cited by examiner

*Primary Examiner* — Li Liu

(74) *Attorney, Agent, or Firm* — Blakely, Sokoloff, Taylor & Zafman, LLP

(57) ABSTRACT

A method and system of distributing clock synchronization information within an optical communications network including a plurality of network elements, in which a first network element receives an ingress clock synchronization message, the ingress clock synchronization message including a clock synchronization message identifier and a correction field. The first network element inserts the clock synchronization message identifier into an optical channel frame overhead and inserts the ingress clock synchronization message into an optical channel frame payload. The first network element transmits the optical channel frame overhead and the optical channel frame payload to a second network element, and determines a transit time of the clock synchronization message identifier across each of the network elements. The second network element updates the correction field of the ingress clock synchronization message with said transit times to form an egress clock synchronization message.

20 Claims, 18 Drawing Sheets

DISTRIBUTING CLOCK SYNCHRONIZATION INFORMATION WITHIN AN OPTICAL COMMUNICATIONS NETWORK

CROSS-REFERENCE TO RELATED APPLICATIONS

This application claims the benefit of PCT Application No. PCT/EP2012/066124, filed Aug. 17, 2012, and EP Application No. 12169191.9, filed May 24, 2012, which are hereby incorporated by reference.

TECHNICAL FIELD

The invention relates to a method of distributing clock synchronization information within an optical communications network, optical communications network elements configured to distribute clock synchronization information and an optical communications network.

BACKGROUND

IEEE 1588v2 Standard for a precision clock synchronization protocol for networked measurement and control systems defines a precision timing protocol, PTP, at the packet layer, which is used to distribute frequency and/or Time of Day ToD (phase). The protocol defines event messages and general PTP messages. Event messages are timed messages having an accurate timestamp that is generated at both transmission and receipt. The set of event messages consists of: Synch; Delay_Req; Pdelay_Req; and Pdelay_Resp.

The protocol defines how real-time clocks in a system synchronise with each other. The clocks in the system are arranged in a master-slave synchronization hierarchy with a grandmaster (GM) clock at the top of the hierarchy which sets the reference time for the system. Slave clocks synchronise with a grand master (GM) clock by exchanging PTP timing messages. Each GM issues PTP event messages time stamped with ToD. Each slave estimates the delay between its respective GM and itself, and adds this delay to the received ToD, to achieve the current ToD, thereby adjusting their clock to the time of their GM.

Newer generations of mobile communications network technology focus on increasing the data throughput, uplink and downlink in a network. This requires tighter phase alignment between neighbouring towers in the network to facilitate hand-over. IEEE1588v2 can provide this phase alignment where other classical synchronization methods cannot.

Transparent Clocks (TC) and Boundary Clocks (BC) are two different methods defined by IEEE 1588v2. A Boundary clock, located at a network element of a communications network, is able to process the PTP event messages received by its ports, to recover the best frequency and phase information and to synchronize the network element in compliance with them, and then to generate the relative PTP event message to downstream network elements of the network through its egress ports. A Transparent clock, located at a network element of a communications network, measures the transit delay (or residence time) of PTP event messages across the network element and inserts this information in a correction field of the PTP event message itself or in a related follow up message (depending on the actual implementation). Thus a "fast" message will have a small correction value, and a packet going through a highly congested switch network element will have a large value. In the end the slave can work out, message by message, what network delays the message has experienced.

A Transport Operator has to provide its mobile customers with IEEE1588 based transport services, illustrated in FIG. 1, configured to provide the best final quality. In the case of an optical transport network, OTN, configured according to ITU-T Recommendation G.709, the following three options are being investigated for implementation as standards: PTP as a client (over Ethernet) [Transparent Transport]; PTP in the OTN Overhead and BC in the OTN network elements; and PTP in the optical supervisory channel, OSC, and BC in the OTN network elements and Line Amplifiers.

The first option may look like the simplest one; the OTN network is unaware of the IEEE1588 messages that are transported across it, and the OTN network maps and transports communications traffic flows (e.g. 10 Gb Ethernet) without knowing their contents. Therefore the IEEE1588 messages contained within OTN packets pass through the OTN network in a transparent way. The first option adheres to the OTN basic concept of enabling transparent transport of client communications traffic and it is suitable for multi-operator networks (as there is no need to extract and process PTP messages). However it suffers the disadvantage of requiring control of all the possible sources of asymmetries within the network, such as: Ethernet Client Mapping and Demapping; forward error correction, FEC; Different Fiber Lengths; Different Wavelengths; Protection Switching; ODU multiplexing and so on.

The second option offers the benefit that asymmetries and noise due to OTN mapping/demapping and FEC are avoided. However it suffers the disadvantage that it goes against the basic principle of transporting client traffic over an OTN network. In practice the second option would be feasible only in the case of a single network operator, where the OTN network element at the end handles the network time. In order to handle the timing of multiple clients with this approach, this option would require an unrealistic implementation of the OTN network element in which multiple BC instances are implemented, each of them handling the time of a different client. This option also suffers the disadvantages of requiring synchronization of all network elements in the OTN network (i.e. handling of an additional synchronization network), asymmetries due to fibre length and dispersion compensating fibre, DCF, are still to be addressed, and specific hardware would be required in the OTN network elements.

In the third option, for each OTN network element and Line Amplifier PTP messages are extracted from the OSC, terminated, regenerated by an IEEE1588 Boundary clock, and then reinserted in the OSC. This means that symmetries and noise due to OTN mapping/demapping, FEC and DCF are resolved. However this option also goes against the basic principle of transporting client traffic over an OTN network. In practice it would be feasible only in case of a Single network operator, where the OTN network element at the end handles the network time. In order to handle the timing of multiple clients with this approach, it would require an unrealistic implementation of the OTN network element in which multiple BC instances are implemented, each handling the time of a different client. The third option also suffers the problems of requiring synchronization of all network elements in the OTN network (i.e. handling of an additional synchronization network), specific hardware would be required in the OTN network elements and Line Amplifiers, and asymmetries due to fibre length are still to be addressed.

The current options are therefore each characterized by some limitations. One main limitation with the second and third options is the need to handle a specific synchronization network where all OTN nodes need to be synchronized. Another limitation with the second and third options is the ability to only support a single network operator. The first option is the only one suitable for use in multi-operator networks but its implementation would require significant modifications to be implemented in the OTN network requirements and in the OTN network hardware to achieve an acceptable level of quality.

SUMMARY

It is an object to provide an improved method of distributing clock synchronization information within an optical communications network. It is a further object to provide improved optical communications network elements configured to distribute clock synchronization information. It is a further object to provide an improved optical communications network.

A first aspect of the invention provides a method of distributing clock synchronization information within an optical communications network comprising a plurality of network elements. The method comprises step a. of receiving an ingress clock synchronization message at a first said network element. The ingress clock synchronization message comprises a clock synchronisation message identifier and a correction field. The method comprises step b. of inserting the clock synchronisation message identifier into an optical channel frame overhead and inserting the ingress clock synchronisation message into an optical channel frame payload. The method comprises step c. of transmitting the optical channel frame overhead and the optical channel frame payload across the first network element, across the network to a second said network element, and across the second network element. Step c. further comprises determining a transit time of the clock synchronisation message identifier across each of the network elements. The method comprises step d., carried out at the second network element, of updating the correction field of the ingress clock synchronisation message with said transit times to form an egress clock synchronisation message.

The method may enable clock synchronisation information to be distributed between network elements an optical communications network without requiring the network elements to be synchronised and may therefore be used with a fully asynchronous network. Each network element may therefore maintain its own synchronisation source according to its own criteria and to the network planning and strategy. The method may enable respective clock synchronisation information to be distributed between network elements for each of a plurality of transport operators, each of which may have their own network time.

In an embodiment, step b. further comprises inserting an indication of an arrival time of the clock synchronisation message into the optical channel frame overhead. Step c. comprises step i. of determining a transit time of the clock synchronisation message identifier across the first network element, and inserting the transit time into the optical channel frame overhead. Step c. comprises step ii. of compiling an optical channel frame comprising the optical channel frame overhead and the optical channel frame payload. Step c. comprises step iii. of transmitting the optical channel frame from the first network element to the second network element. Step c. comprises step iv., carried out at the second network element, of receiving the optical channel frame and obtaining the transit time from the optical channel frame overhead. Step c. comprises step v. of transmitting the optical channel frame across the second network element and determining a transit time of the clock synchronisation message identifier across the second network element. Step d. comprises extracting the ingress clock synchronisation message from the optical channel frame payload and updating the correction field with a sum of the respective transit times across each said network element to form the egress clock synchronisation message.

Inserting only the clock synchronisation message identifier and an indication of an arrival time of the clock synchronisation message into the overhead may reduce the bandwidth of the information to be placed in the overhead.

In an embodiment, step c. iii. comprises transmitting the optical channel frame from the first network element to an intermediate network element. Step c. iii. further comprises, at the intermediate network element, determining a transit time of the clock synchronisation message identifier across the intermediate network element and adding said transit time to the transit time in the optical channel frame overhead. Step c. iii. further comprises transmitting the optical channel frame from the intermediate network element to the second network element.

The method may enable clock synchronisation information to be distributed across an optical communications network without requiring the network elements of the network to be synchronised and may therefore be used with a fully asynchronous network. The method may enable respective clock synchronisation information to be distributed across the same optical communications network for each of a plurality of transport operators, each of which may have their own network time. The method may distribute clock synchronisation information across an optical communications network without requiring the correction field to be updated at each intermediate network element, the correction field of the clock synchronisation message only being updated at the final network element, to form an egress clock synchronisation message.

In an embodiment, in step c. iii. the optical channel frame is transmitted from the first network element to the second network element via a plurality of intermediate network elements, and a respective transit time is determined at each intermediate network element and added to the transit time in the optical channel frame overhead.

In an embodiment, the clock synchronisation message is a precision timing protocol event message. The method may be used to distribute PTP frequency and/or Time of Day ToD across a network.

In an embodiment, the transit time across each said network element is determined using an end-to-end transparent clock function. The end-to-end transparent clock is based on the principle of the end to end transparent clock function defined in the IEEE 1588 Standard. Implementing the method with end-to-end transparent clocks may significantly simplify the distribution of clock synchronisation information across a network. Using an optical channel frame overhead to transport clock synchronisation information together with implementing transparent clocks to determine the transit time across each network element, network element by network element, may enable the method to overcome the single transport operator limitation faced by the prior art, enabling respective clock synchronisation information to be distributed between network elements for each of a plurality of transport operators. This may enable the best final quality of service to be provided in a relatively simple and cost effective manner.

In an embodiment, the method further comprises determining a link delay between each adjacent pair of network elements between which the optical channel frame is transmitted. In an embodiment, the transit time across each said network element is determined using a methodology analogous to the peer-to-peer transparent clock function defined in the IEEE 1588 Standard.

In an embodiment, the method comprises, at each network element, providing an indication of an arrival time of the clock synchronisation message identifier and an indication of an exit time of the clock synchronisation message identifier, and the transit time is determined as the difference between the arrival time and the exit time. This may minimise the number of calculations required to determine the transit time.

In an embodiment, the optical channel frame overhead comprises a frame alignment word. In step c. each transit time is determined by comparing a position of the frame alignment word with a respective reference frame alignment word position. This may minimise the number of calculations required to determine the transit time.

In an embodiment, step a. further comprises calculating a frame period of the clock synchronisation message.

In an embodiment, the optical communications network is an optical transport network and the optical channel frame is an optical transport network frame. In an embodiment, the optical channel frame overhead is an optical transport unit overhead.

In an embodiment, the optical channel frame overhead is an optical channel data unit overhead and the optical channel frame payload is an optical channel data unit.

In an embodiment, the optical channel frame overhead is an optical supervisory channel frame overhead. Use of the optical supervisory channel frame overhead may enable asymmetries due to transmission across dispersion compensating fibre and fibre length asymmetries to be corrected for.

In an embodiment, in step b. the clock synchronisation message identifier is inserted into an optical channel frame overhead by copying the clock synchronisation message identifier into the optical channel frame overhead. Copying the clock synchronisation message identifier without removing the message from the payload may avoid bandwidth variations within the optical channel frame payload. Moreover by only copying the message identifier into the overhead rather than the full message waste of the bandwidth of the optical channel frame overhead may be avoided.

In an embodiment, in step b. the clock synchronisation message identifier is inserted into an optical channel frame overhead by extracting the clock synchronisation message identifier from the clock synchronisation message and inserting the extracted clock synchronisation message identifier into the optical channel frame overhead.

In an embodiment, in step b. each ingress clock synchronisation message, including the clock synchronisation message identifier, is inserted into an optical channel frame overhead.

In an embodiment, in step a. a plurality of ingress clock synchronisation messages are received at the first network element. In step b. a respective clock synchronisation message identifier of each ingress clock synchronisation message is inserted into the optical channel frame overhead and each ingress clock synchronisation message is inserted into the optical channel frame payload. In step c., the respective transit times across the network elements are the transit times of all the clock synchronisation message identifiers. In step d., the respective correction field of each ingress clock synchronisation message is updated with a sum of the respective transit times across each said network element to form a plurality of egress clock synchronisation messages.

In an embodiment, in step d. a respective arrival time of each ingress clock synchronisation message is inserted into the optical channel frame overhead. In step d. each ingress clock synchronisation message is extracted from the optical channel frame payload and then each respective correction field is updated with a sum of the respective transit times across each said network element to form a plurality of egress clock synchronisation messages.

Inserting only the clock synchronisation message identifier and an indication of an arrival time of the clock synchronisation message into the overhead may minimise the bandwidth of the information to be placed in the overhead for each clock synchronisation message, and may maximise the number of clock synchronisation messages which may be transported in a single optical channel frame.

A second aspect of the invention provides a data carrier having computer readable instructions embodied therein for providing access to resources available on a processor. The computer readable instructions comprising instructions to cause the processor to perform any of the above steps of the method of distributing clock synchronization information within an optical communications network.

In an embodiment, the data carrier is a non-transitory data carrier.

A third aspect of the invention provides a first optical communications network element configured to receive an ingress clock synchronization message. The ingress clock synchronization message comprises a clock synchronisation message identifier and a correction field. The first optical communications network element is configured to insert the clock synchronisation message identifier into an optical channel frame overhead. The first optical communications network element is configured to insert the ingress clock synchronisation message into an optical channel frame payload. The first optical communications network element is configured to transmit the optical channel frame overhead and payload across the first network element. The first optical communications network element is configured to determine a transit time of the clock synchronisation message identifier across the first optical communications network element. The first optical communications network element is configured to generate and transmit an optical signal carrying the optical channel frame overhead and the optical channel frame payload.

The first network element may enable clock synchronisation information to be distributed to another network element an optical communications network without requiring the network elements to be synchronised. The first network element may therefore be used to construct of a fully asynchronous network. Each network element may maintain its own synchronisation source according to its own criteria and to the network planning and strategy. The first network element may enable respective clock synchronisation information to be distributed to another network element for each of a plurality of transport operators, each of which may have their own network time. Inserting only the clock synchronisation message identifier into the overhead may reduce the bandwidth of the information to be placed in the overhead.

In an embodiment, the first network element is configured to insert an indication of an arrival time of the clock synchronisation message into the optical channel frame overhead. The first optical communications network element is configured to insert the transit time into the optical channel frame overhead. The first optical communications network element is configured to compile an optical channel frame comprising the optical channel frame overhead and the optical channel frame payload. The first optical communications network element is configured to generate and transmit an optical signal carrying the optical channel frame.

Inserting only the clock synchronisation message identifier and an indication of an arrival time of the clock synchronisation message into the overhead may reduce the bandwidth of the information to be placed in the overhead.

In an embodiment, the clock synchronisation message is a precision timing protocol event message. The first network element may be used to distribute PTP frequency and/or Time of Day ToD to another network element within a network.

In an embodiment, the first optical communications network element comprises one of an end-to-end transparent clock function based on the transparent clock function defined in the IEEE 1588 Standard and a peer-to-peer transparent clock function based on the transparent clock function defined in the IEEE 1588 Standard.

Using an end-to-end transparent clock together with transporting clock synchronisation information in an optical channel frame overhead may significantly simplify the distribution of clock synchronisation information between network elements. Using an optical channel frame overhead to transport clock synchronisation information together with implementing transparent clocks to determine the transit time across the first network element, may enable the first network element to distribute respective clock synchronisation information for each of a plurality of transport operators.

In an embodiment, the first network element is configured to provide an indication of an exit time of the clock synchronisation message identifier. The first network element is configured to determine the transit time as the difference between the arrival time and the exit time. This may minimise the number of calculations required to determine the transit time.

In an embodiment, the optical channel frame overhead comprises a frame alignment word. The first network element is configured to determine the transit time by comparing a position of the frame alignment word with a reference frame alignment word position. This may minimise the number of calculations required to determine the transit time.

In an embodiment, the optical communications network is an optical transport network and the optical channel frame is an optical transport network frame. In an embodiment, the optical channel frame overhead is an optical transport unit overhead.

In an embodiment, the optical channel frame overhead is an optical channel data unit overhead and the optical channel frame payload is an optical channel data unit.

In an embodiment, the optical channel frame overhead is an optical supervisory channel frame overhead. Use of the optical supervisory channel frame overhead may enable asymmetries due to transmission across dispersion compensating fibre and fibre length asymmetries to be corrected for.

In an embodiment, the first network element is configured to insert the clock synchronisation message identifier into an optical channel frame overhead by copying the clock synchronisation message identifier into the optical channel frame overhead. Copying the clock synchronisation message identifier without removing the message from the payload may avoid bandwidth variations within the optical channel frame payload. Moreover by only copying the message identifier into the overhead rather than the full message waste of the bandwidth of the optical channel frame overhead may be avoided.

In an embodiment, the first network element is configured to insert the clock synchronisation message identifier into an optical channel frame overhead by extracting the clock synchronisation message identifier from the clock synchronisation message and placing the extracted clock synchronisation message identifier into the optical channel frame overhead.

In an embodiment, the first network element is further configured to calculate a frame period of the clock synchronisation message.

In an embodiment, the first network element is configured to insert the clock synchronisation message, including the clock synchronisation message identifier, into an optical channel frame overhead.

In an embodiment, the first network element is configured to receive a plurality of ingress clock synchronisation messages. The first network element is configured to insert each clock synchronisation message identifier into the optical channel frame overhead and to insert each ingress clock synchronisation message into the optical channel frame payload In an embodiment, the first network element is configured to extract a clock synchronisation message identifier from each ingress clock synchronisation message and then to insert each clock synchronisation message identifier and a respective arrival time of each ingress clock synchronisation message into the optical channel frame overhead.

Inserting only the clock synchronisation message identifier and an indication of an arrival time of each ingress clock synchronisation message into the overhead may minimise the bandwidth of the information to be placed in the overhead for each ingress clock synchronisation message, and may maximise the number of ingress clock synchronisation messages which may be transported in a single optical channel frame.

In an embodiment, the first network element is configured to insert each ingress clock synchronisation message, including the clock synchronisation message identifier, into an optical channel frame overhead.

A fourth aspect of the invention provides a second optical communications network element configured to receive an optical channel frame overhead and an optical channel frame payload from an optical communications network. The optical channel frame overhead comprises a clock synchronisation message identifier. The optical channel frame payload comprises an ingress clock synchronisation message, which comprises the clock synchronisation message identifier and a correction field. The second network element is configured to transmit the optical channel frame across the second network element. The second network element is configured to determine a transit time of the clock synchronisation message identifier across the second network element. The second network element is configured to obtain a transit time of the clock synchronisation message identifier across at least one other network element in said optical communications network. The second network element is configured to update the correction field of the ingress clock synchronisation message with a sum of the said transit times to form an egress clock synchronisation message.

The second network element may enable clock synchronisation information to be received from another network element an optical communications network without requiring the network elements to be synchronised. The second network element may therefore be used to construct of a fully asynchronous network. Each network element may maintain its own synchronisation source according to its own criteria and to the network planning and strategy. The second network element may enable respective clock synchronisation information to be received from another network element for each of a plurality of transport operators, each of which may have their own network time.

In an embodiment, the optical channel frame overhead further comprises the transit time of the clock synchronisation message identifier across said at least one other network element. The second optical communications network element is configured to, in step ii., obtain the transit time of the clock synchronisation message identifier across the at least one other network element from the optical channel frame overhead. The second network element is configured to, in step iii., extract the ingress clock synchronisation message from the optical channel frame payload and to then update the correction field with a sum of the said transit times to form the egress clock synchronisation message.

In an embodiment, the clock synchronisation message is a precision timing protocol event message. The second network element may be used to receive PTP frequency and/or Time of Day ToD from another network element within a network.

In an embodiment, the second optical communications network element comprises one of an end-to-end transparent clock function based on the transparent clock function defined in the IEEE 1588 Standard and a peer-to-peer transparent clock function on the transparent clock function defined in the IEEE 1588 Standard.

Using an end-to-end transparent clock function together with transporting clock synchronisation information in an optical channel frame overhead may significantly simplify the distribution of clock synchronisation information between network elements. Using an optical channel frame overhead to transport clock synchronisation information together with implementing transparent clocks to determine the transit time across the second network element, may enable the second network element to receive respective clock synchronisation information for each of a plurality of transport operators.

In an embodiment, the second optical communications network element is configured to determine a link delay between itself and a network element from which the optical channel frame is received. In an embodiment, the transit time across each the second optical communications network element is determined using a methodology analogous to the peer-to-peer transparent clock function defined in the IEEE 1588 Standard.

In an embodiment, the second network element is configured to provide an indication of an arrival time of the clock synchronisation message identifier and an indication of an exit time of the clock synchronisation message identifier. The second network element is configured to determine the transit time as the difference between the arrival time and the exit time. This may minimise the number of calculations required to determine the transit time.

In an embodiment, the optical channel frame overhead comprises a frame alignment word. The second network element is configured to determine the transit time by comparing a position of the frame alignment word with a reference frame alignment word position. This may minimise the number of calculations required to determine the transit time.

In an embodiment, the second network element is further configured to calculate a frame period of the clock synchronisation message.

In an embodiment, the optical communications network is an optical transport network and the optical channel frame is an optical transport network frame. In an embodiment, the optical channel frame overhead is one of an optical transport unit frame overhead and an optical supervisory channel frame overhead. Use of the optical supervisory channel frame overhead may enable asymmetries due to transmission across dispersion compensating fibre and fibre length asymmetries to be corrected for.

In an embodiment, the second network element is configured to extract a plurality of clock synchronisation messages from the optical channel frame overhead. The second network element is configured to update the respective correction field of each ingress clock synchronisation message with a sum of the respective transit times across each said network element to form a plurality of egress clock synchronisation messages.

A fifth aspect of the invention provides an optical communications network comprising a first optical communications network element and a second optical communications network element. The first optical communications network element configured to receive an ingress clock synchronization message. The ingress clock synchronization message comprises a clock synchronisation message identifier and a correction field. The first optical communications network element is configured to insert the clock synchronisation message identifier into an optical channel frame overhead. The first optical communications network element is configured to insert the ingress clock synchronisation message into an optical channel frame payload. The first optical communications network element is configured to transmit the optical channel frame overhead and payload across the first network element. The first optical communications network element is configured to determine a transit time of the clock synchronisation message identifier across the first optical communications network element. The first optical communications network element is configured to generate and transmit an optical signal carrying the optical channel frame overhead and the optical channel frame payload. The second optical communications network element configured to receive the optical channel frame overhead and the optical channel frame payload. The second network element is configured to transmit the optical channel frame overhead and the optical channel frame payload across the second network element. The second network element is configured to determine a transit time of the clock synchronisation message identifier across the second network element. The second network element is configured to obtain a transit time of the clock synchronisation message identifier across the first network element. The second network element is configured to update the correction field of the ingress clock synchronisation message with a sum of the said transit times to form an egress clock synchronisation message.

The optical communications network may enable clock synchronisation information to be distributed the network without requiring the network elements to be synchronised. The network element may therefore be a fully asynchronous network. Each network element may maintain its own synchronisation source according to its own criteria and to the network planning and strategy. The network may enable respective clock synchronisation information to be distributed across the network for each of a plurality of transport operators, each of which may have their own network time. Inserting only the clock synchronisation message identifier into the overhead may reduce the bandwidth of the information to be placed in the overhead.

In an embodiment, the first network element is configured to insert an indication of an arrival time of the clock synchronisation message into the optical channel frame overhead. The first optical communications network element is configured to insert the transit time into the optical channel frame overhead. The first optical communications network element is configured to compile an optical channel frame comprising the optical channel frame overhead and the optical channel frame payload. The first optical communications network element is configured to generate and transmit an optical signal carrying the optical channel frame.

Inserting only the clock synchronisation message identifier and an indication of an arrival time of the clock synchronisation message into the overhead may reduce the bandwidth of the information to be placed in the overhead.

In an embodiment, the clock synchronisation message is a precision timing protocol event message. The network may be used to distribute PTP frequency and/or Time of Day ToD across the network.

In an embodiment, each optical communications network element comprises one of an end-to-end transparent clock function and a peer-to-peer transparent clock function. The end-to-end transparent clock function is based on the principle of the end to end transparent clock function defined in the IEEE 1588 Standard. The peer-to-peer transparent clock function is based on the principle of the peer-to-peer transparent clock function defined in the IEEE 1588 Standard.

Using an end-to-end transparent clock function together with transporting clock synchronisation information in an optical channel frame overhead may significantly simplify the distribution of clock synchronisation information between network elements. Using an optical channel frame overhead to transport clock synchronisation information together with implementing transparent clocks to determine the transit time across the network elements, may enable the network to distribute respective clock synchronisation information for each of a plurality of transport operators.

In an embodiment, each network element is configured to provide an indication of an exit time of the clock synchronisation message identifier. Each network element is configured to determine the transit time as the difference between the arrival time and the exit time. This may minimise the number of calculations required to determine each transit time.

In an embodiment, the optical channel frame overhead comprises a frame alignment word. Each network element is configured to determine the respective transit time by comparing a position of the frame alignment word with a respective reference frame alignment word position. This may minimise the number of calculations required to determine each transit time.

In an embodiment, the optical communications network is an optical transport network and the optical channel frame is an optical transport network frame. In an embodiment, the optical channel frame overhead is an optical transport unit overhead.

In an embodiment, the optical channel frame overhead is an optical channel data unit overhead and the optical channel frame payload is an optical channel data unit.

In an embodiment, the optical channel frame overhead is an optical supervisory channel frame overhead. Use of the optical supervisory channel frame overhead may enable asymmetries due to transmission across dispersion compensating fibre and fibre length asymmetries to be corrected for.

In an embodiment, the first network element is configured to insert the clock synchronisation message identifier into an optical channel frame overhead by copying the clock synchronisation message identifier into the optical channel frame overhead. Copying the clock synchronisation message identifier without removing the message from the payload may avoid bandwidth variations within the optical channel frame payload. Moreover by only copying the message identifier into the overhead rather than the full message waste of the bandwidth of the optical channel frame overhead may be avoided.

In an embodiment, the first network element is configured to insert the clock synchronisation message identifier into an optical channel frame overhead by moving the clock synchronisation message identifier from the clock synchronisation message into the optical channel frame overhead.

In an embodiment, the first network element is further configured to calculate a frame period of the clock synchronisation message.

In an embodiment, the first network element is configured to insert the clock synchronisation message, including the clock synchronisation message identifier, into an optical channel frame overhead.

In an embodiment, the first network element is configured to receive a plurality of ingress clock synchronisation messages. The first network element is configured to insert each clock synchronisation message identifier into the optical channel frame overhead and to insert each ingress clock synchronisation message into the optical channel frame payload In an embodiment, the first network element is configured to extract a clock synchronisation message identifier from each ingress clock synchronisation message and then to insert each clock synchronisation message identifier and a respective arrival time of each ingress clock synchronisation message into the optical channel frame overhead.

Inserting only the clock synchronisation message identifier and an indication of an arrival time of each ingress clock synchronisation message into the overhead may minimise the bandwidth of the information to be placed in the overhead for each ingress clock synchronisation message, and may maximise the number of ingress clock synchronisation messages which may be transported in a single optical channel frame.

In an embodiment, the first network element is configured to insert each ingress clock synchronisation message, including the clock synchronisation message identifier, into an optical channel frame overhead.

In an embodiment, the second optical communications network element is configured to, in step ii., obtain the transit time of the clock synchronisation message identifier across the at least one other network element from the optical channel frame overhead. The second network element is configured to, in step iii., extract the ingress clock synchronisation message from the optical channel frame payload and to then update the correction field with a sum of the said transit times to form the egress clock synchronisation message.

In an embodiment, the second optical communications network element is configured to determine a link delay between itself and a network element from which the optical channel frame is received.

In an embodiment, the second network element is configured to extract a plurality of clock synchronisation messages from the optical channel frame overhead. The second network element is configured to update the respective correction field of each ingress clock synchronisation message with a sum of the respective transit times across each said network element to form a plurality of egress clock synchronisation messages.

Embodiments of the invention will now be described, by way of example only, with reference to the accompanying drawings.

DETAILED DESCRIPTION

Figure 1:
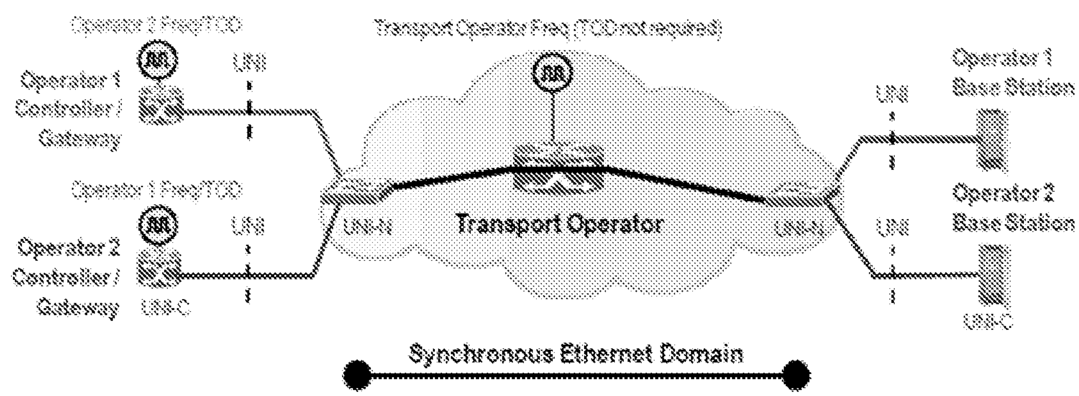
FIG. 1 is an illustration of a prior art communications network in which a transport operator provides services to two network operators.

FIG. 1 shows the steps of a method 1 of distributing clock synchronization information within an optical communications network comprising a plurality of network elements, according to a first embodiment of the invention.

The method 1 comprises:

a. receiving an ingress clock synchronization message at a first said network element, the ingress clock synchronization message comprising a clock synchronisation message identifier and a correction field 2;

b. inserting the clock synchronisation message identifier into an optical channel frame overhead 3 and inserting the ingress clock synchronisation message into an optical channel frame payload 4;

c. transmitting the optical channel frame overhead and the optical channel frame payload across the first network element, across the network to a second said network element, and across the second network element 5 and determining a transit time of the clock synchronisation message identifier across each of the network elements 6; and d. at the second network element, updating the correction field of the ingress clock synchronisation message with said transit times to form an egress clock synchronisation message 7.

Figure 2:
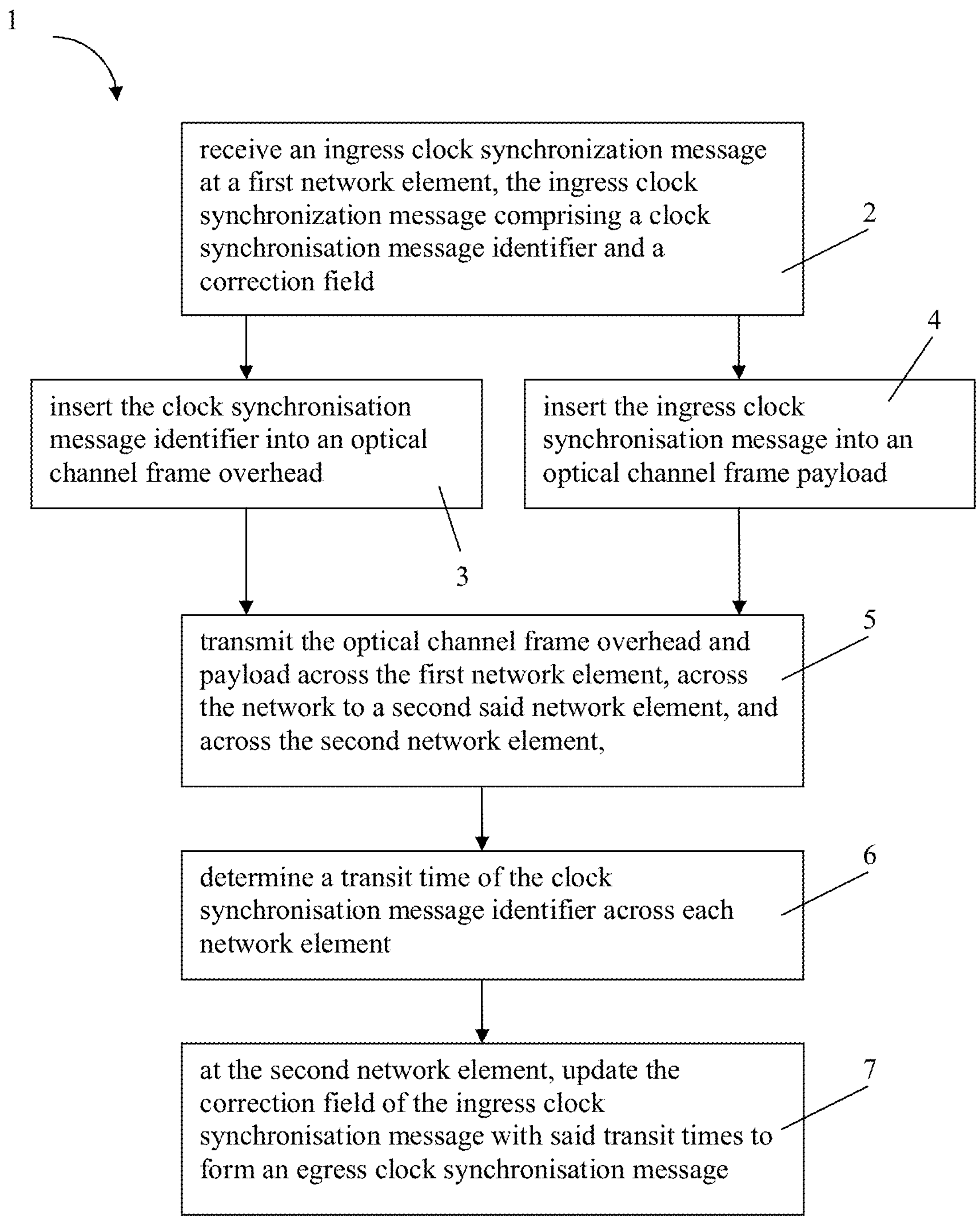
FIG. 2 shows the steps of a method of distributing clock synchronization information within an optical communications network according to a first embodiment of the invention.
Figures 3, 4:
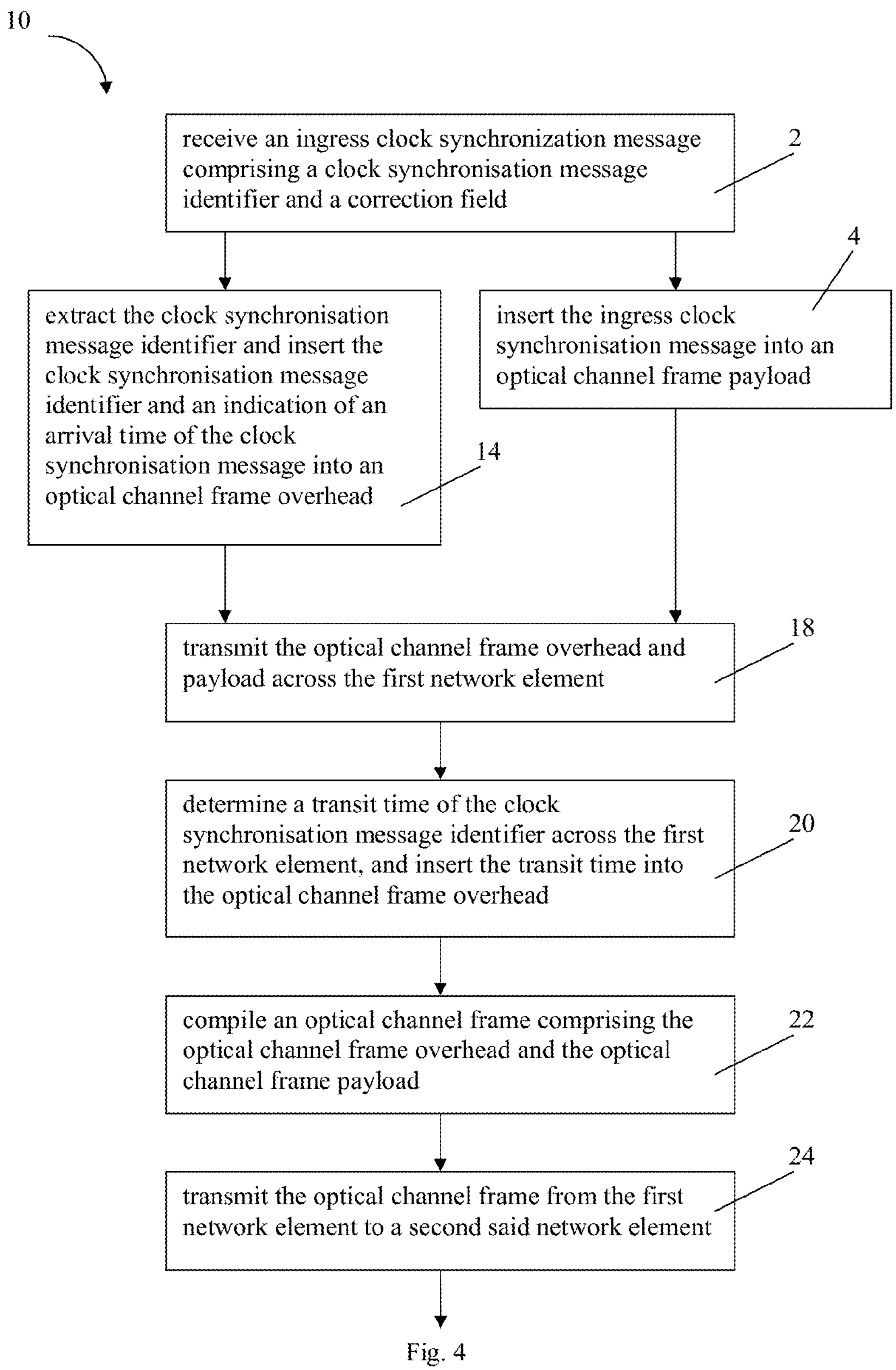
FIG. 3 shows some of the steps of a method of distributing clock synchronization information within an optical communications network according to a second embodiment of the invention.
FIG. 4 shows the remainder of the steps of the method of distributing clock synchronization information within an optical communications network according to the second embodiment of the invention.
Figure 4:
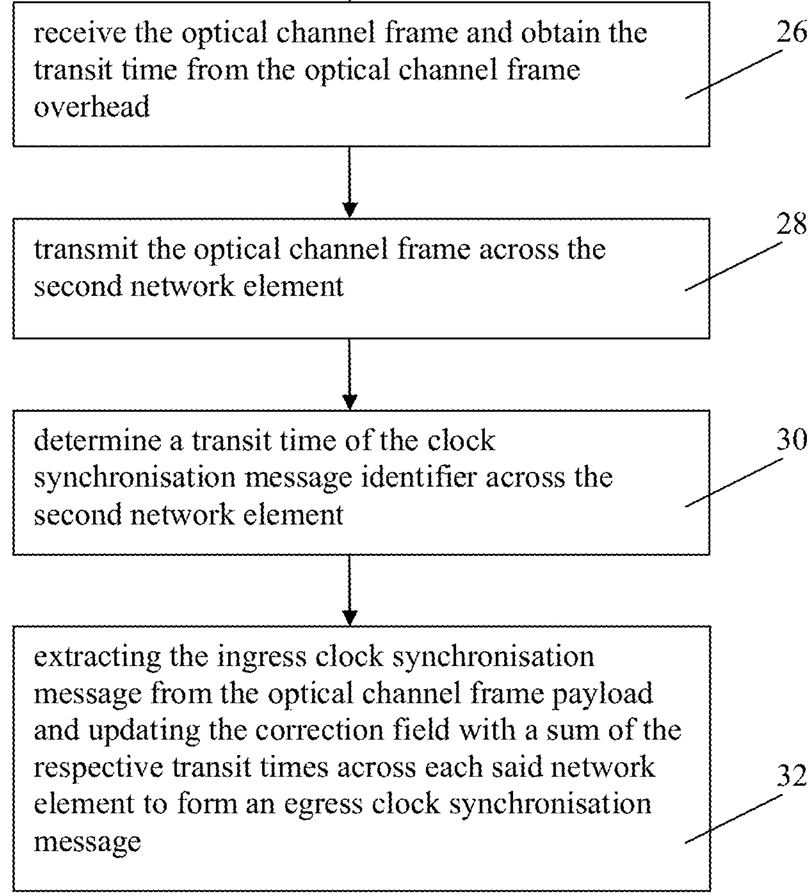

Referring to FIGS. 3 and 4, a second embodiment of the invention provides a method 10 of distributing clock synchronization information within an optical communications network comprising a plurality of network elements. The method 10 of this embodiment is similar to the method 1 shown in FIG. 2, with the following modifications. The same reference numbers are retained for corresponding steps.

In this embodiment, step b. further comprises inserting an indication of an arrival time of the clock synchronisation message into the optical channel frame overhead 14.

Step c. comprises:

i. determining a transit time of the clock synchronisation message identifier across the first network element, and inserting the transit time into the optical channel frame overhead 20;

ii. compiling an optical channel frame comprising the optical channel frame overhead and the optical channel frame payload 22;

iii. transmitting the optical channel frame from the first network element to the second network element 24;

iv. at the second network element, receiving the optical channel frame and obtaining the transit time from the optical channel frame overhead 26; and v. transmitting the optical channel frame across the second network element 28 and determining a transit time of the clock synchronisation message identifier across the second network element 30.

Step d. comprises extracting the ingress clock synchronisation message from the optical channel frame payload and updating the correction field with a sum of the respective transit times across each said network element to form the egress clock synchronisation message 32.

Figure 5:
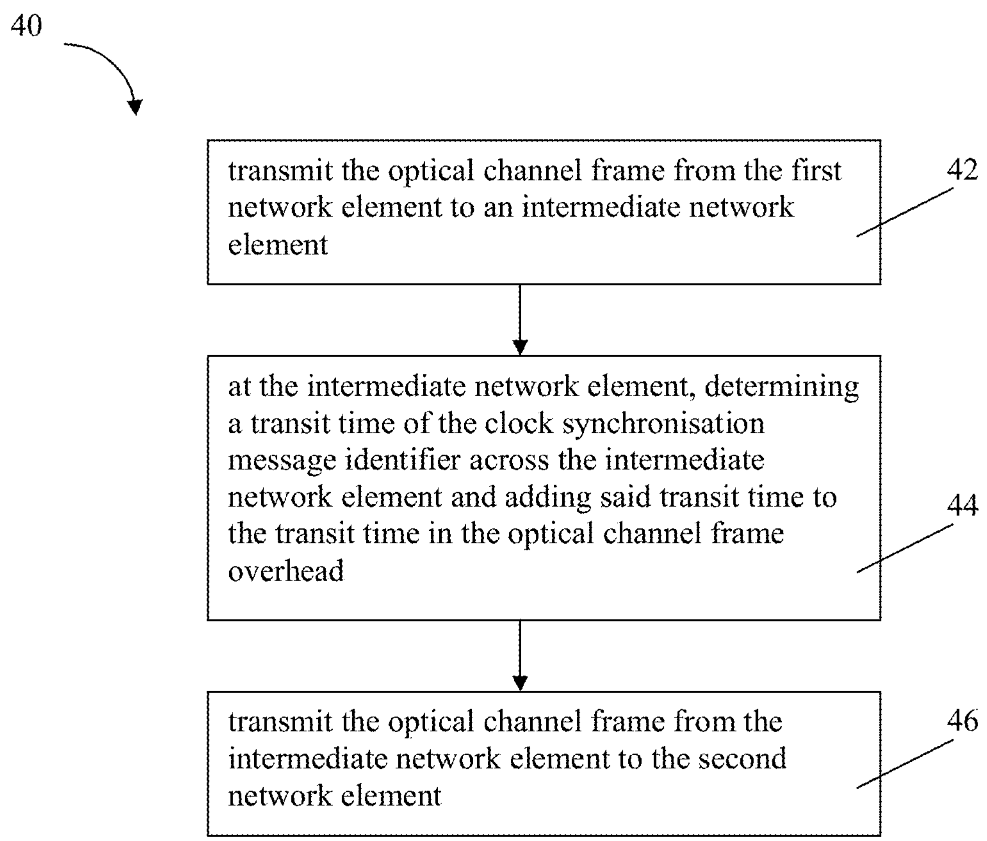
FIG. 5 shows step c. iii. of a method of distributing clock synchronization information within an optical communications network according to a third embodiment of the invention.

Referring to FIG. 5, a third embodiment of the invention provides a method of distributing clock synchronization information within an optical communications network comprising a plurality of network elements. The method of this embodiment is similar to the method 10 of the first embodiment, with the following modifications.

In this embodiment, step c. iii. 40 comprises a first step of transmitting the optical channel frame from the first network element to an intermediate network element 42. Step c. iii. further comprises, at the intermediate network element, determining a transit time of the clock synchronisation message identifier across the intermediate network element 44. The transit time which has been determined is then added to the transit time in the optical channel frame overhead 44.

Step. c. iii. further comprises transmitting the optical channel frame from the intermediate network element to the second network element 46.

It will be appreciated that step c. iii. may comprise transmitting the optical channel frame from the first network element to the second network element via a plurality of intermediate network elements, the transit time across each intermediate network element being determined and added to the transit time in the optical channel frame overhead received at each respective intermediate network element.

Figures 6, 7:
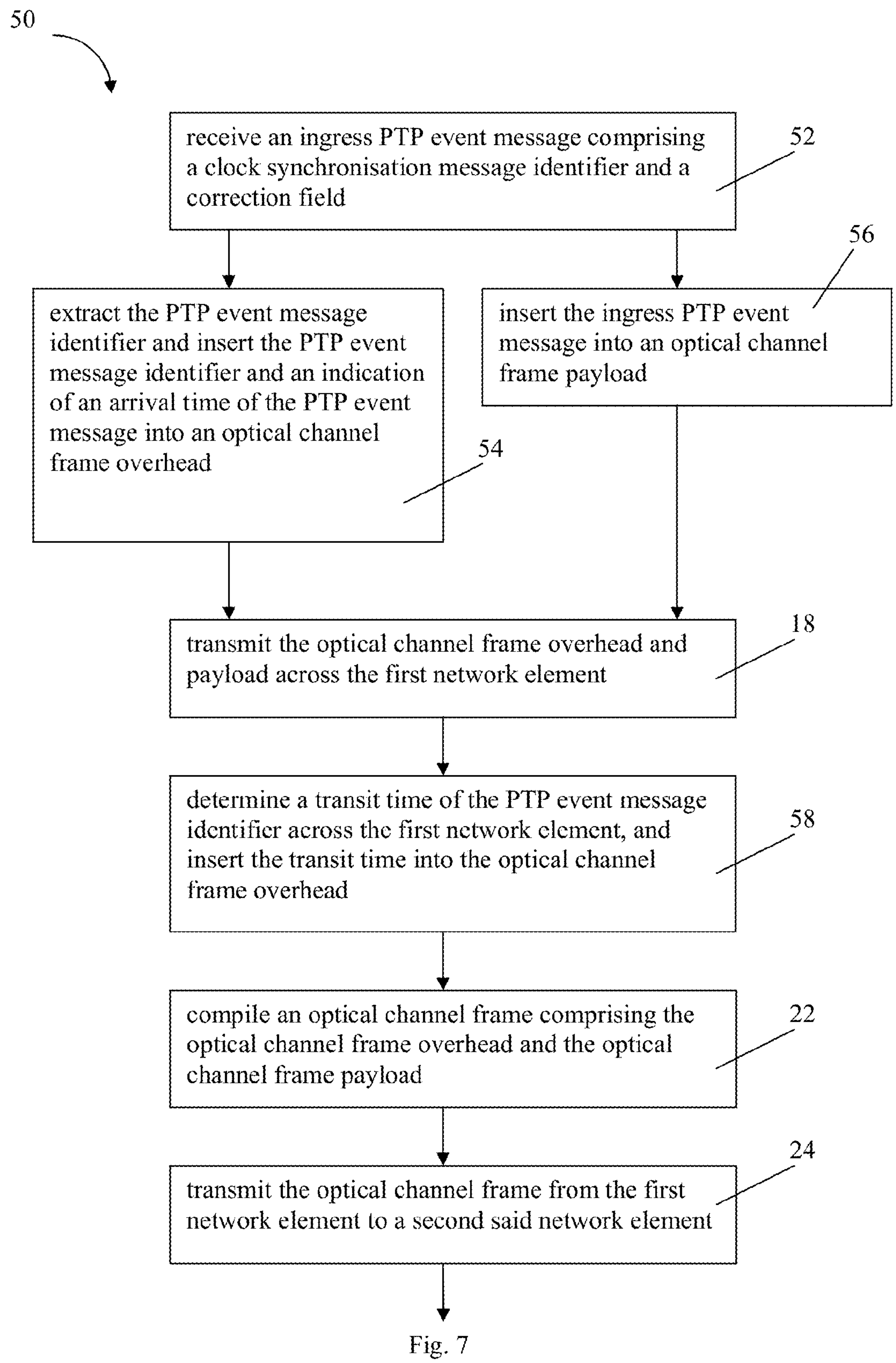
FIG. 6 shows some of the steps of a method of distributing clock synchronization information within an optical communications network according to a fourth embodiment of the invention.
FIG. 7 shows the remainder of the steps of the method of distributing clock synchronization information within an optical communications network according to the fourth embodiment of the invention.
Figure 7:
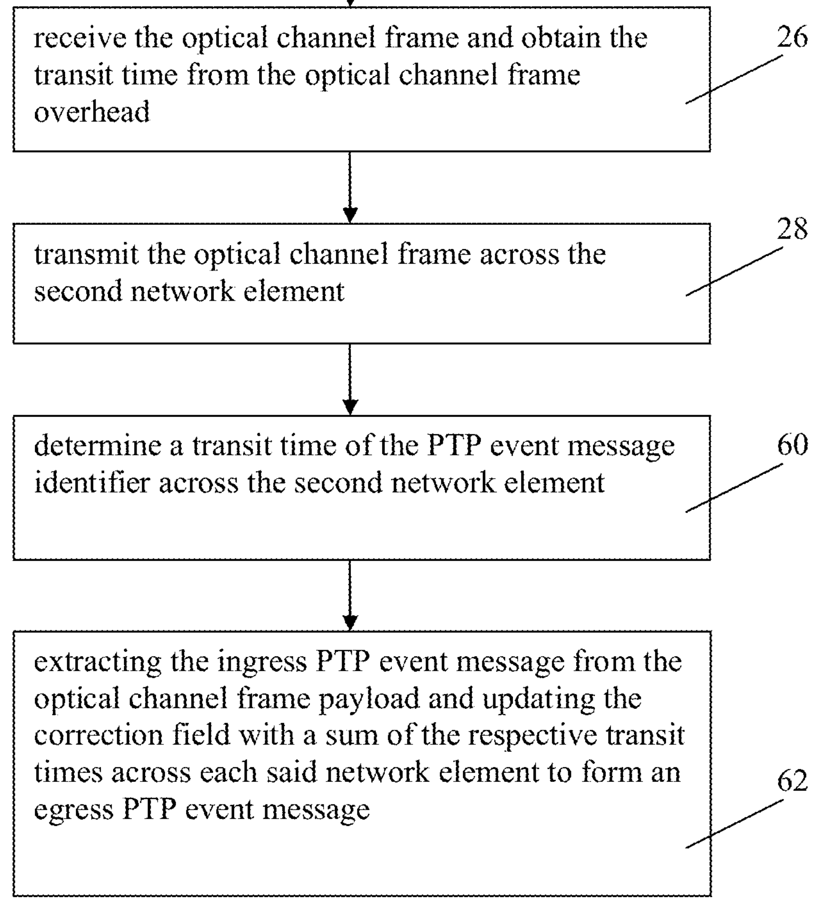

FIGS. 6 and 7 show the steps of a method 50 of distributing clock synchronization information within an optical communications network comprising a plurality of network elements according to a fourth embodiment of the invention. The method 50 of this embodiment is similar to the method 10 shown in FIGS. 3 and 4, with the following modifications. The same reference numbers are retained for corresponding steps.

In this embodiment, the clock synchronization message is a precision timing protocol, PTP, event message. The PTP event message is received 52 at the first network element and the PTP event message identifier is extracted and inserted, with an indication of its arrival time, into an optical channel frame overhead 54. The PTP event message itself is inserted into an optical channel frame payload 56. The transit time of the PTP event message identifier across the first network element is determined and the transit time inserted into the optical channel frame overhead 58.

Similarly, at the second network element the transit time of the PTP event message identifier across the second network element is determined 60. The PTP event message is extracted from the optical channel frame payload and the PTP event message correction field is updated with a sum of the respective transit times across each said network element, to form an egress PTP event message 62.

Figure 8:
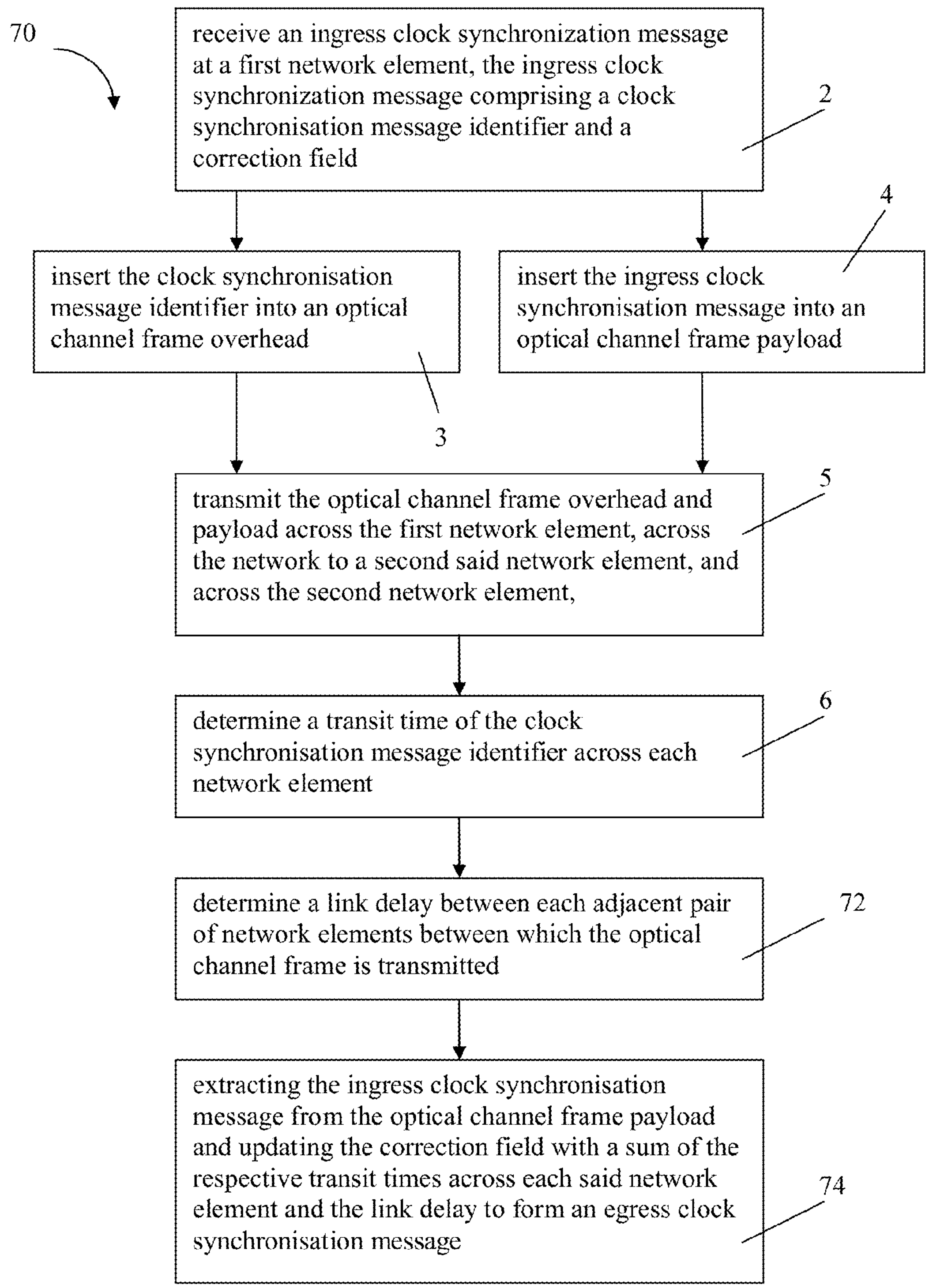
FIG. 8 shows the steps of a method of distributing clock synchronization information within an optical communications network according to a fifth embodiment of the invention.

Referring to FIG. 8, a fifth embodiment of the invention provides a method 70 of distributing clock synchronization information within an optical communications network comprising a plurality of network elements. The method of this embodiment is similar to the method 1 of the first embodiment, with the following modifications.

In this embodiment, step d. additionally comprises determining a link delay between each adjacent pair of network elements between which the optical channel frame is transmitted 72. The correction field of the ingress clock synchronisation message is additionally updated with the link delay to form the egress clock synchronisation message 74. The method of this embodiment uses a methodology analogous to the peer-to-peer transparent clock function defined in the IEEE 1588 Standard. It will therefore be appreciated by the person skilled in the art that the method 70 will involve the exchange of specific messages between adjacent nodes in order to determine the link delay.

Figure 9:
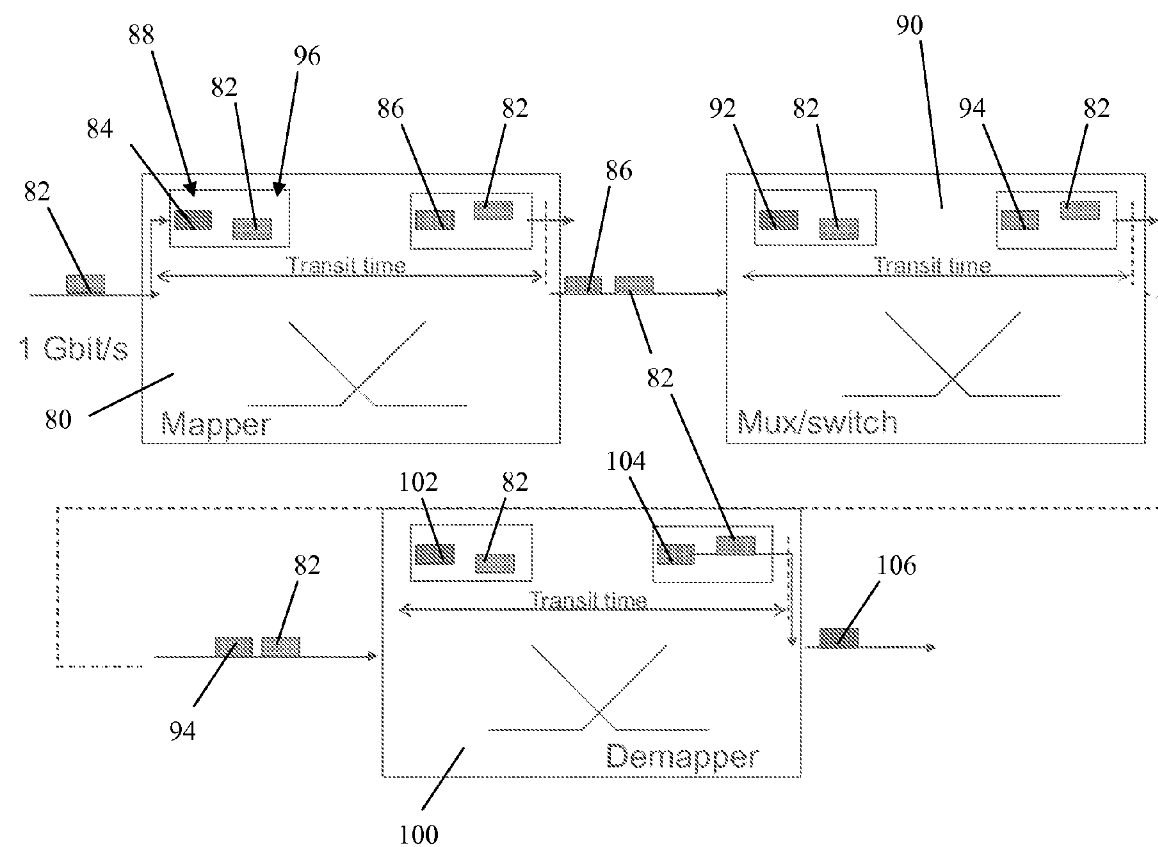
FIG. 9 is a schematic representation of an optical communications network comprising a first network element ('mapper'), an intermediate network element ('mux/switch') and a second network element ('demapper') across which clock synchronization information is distributed using a method of distributing clock synchronization information within an optical communications network according to a sixth embodiment of the invention.
Figure 10:
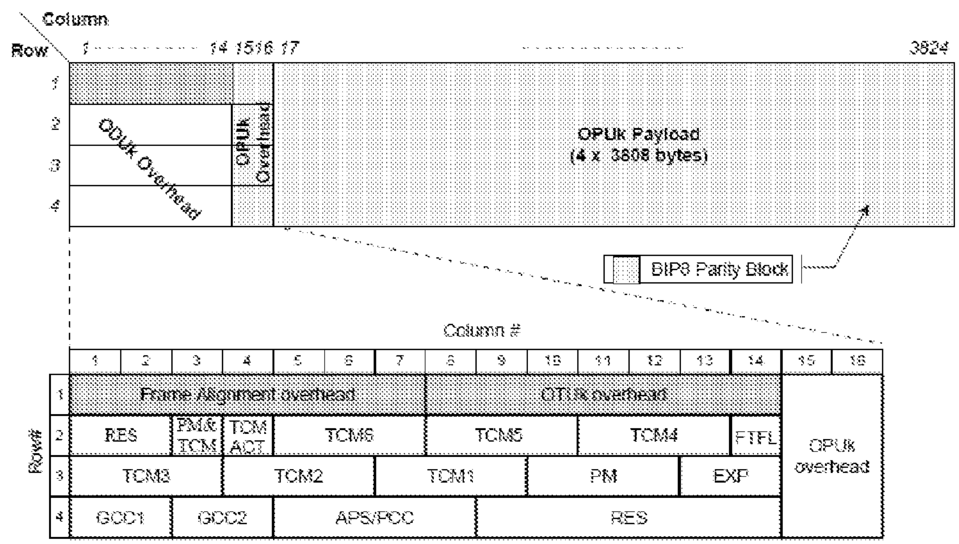
FIG. 10 is a diagrammatic representation of the optical transport network, OTN, frame and overhead.
Figure 11:
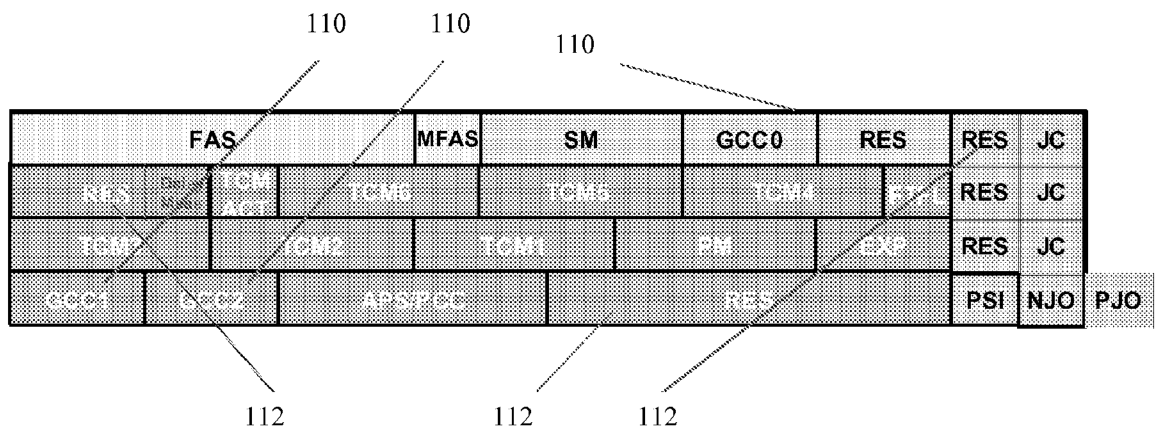
FIG. 11 is a diagrammatic representation of part of the optical transport network, OTN, overhead of FIG. 10.

Referring to FIGS. 9 to 11, a sixth embodiment of the invention provides a method of distributing clock synchronization information within an optical communications network comprising a plurality of network elements 80, 90, 100.

In this embodiment, a Gbit/s client signal carrying an ingress IEEE 1588 PTP event message 82 is received at the first network element, which in this example is a mapper 80. The ingress PTP event message 82 comprises a PTP event message identifier and a correction field. The mapper comprises an edge-to-edge transparent clock function, TC (not illustrated).

On receipt at the mapper the ingress PTP event message 82 is time stamped with its arrival time by the TC. The PTP event message identifier is extracted from the PTP event message. The PTP event message identifier and the arrival time, which together will be referred to here as PTP information 84, are inserted into an OTN overhead 88, as shown in FIGS. 10 and 11. The PTP event message 82 is inserted into an OTN payload 96, as shown in FIG. 10.

The OTN overhead and payload are transmitted across the mapper 80 and time stamped with the exit time of the OTN overhead by the TC. The TC then calculates the transit time of the OTN overhead across the mapper as the difference between the arrival time and the exit time. The transit time is inserted into a PTP information correction field in the OTN overhead, to form an updated PTP information 86.

The mapper 80 compiles an OTN frame from the OTN overhead 88 and the OTN payload 96 and transmits a carrier signal carrying the OTN frame to an intermediate network element 90.

In this embodiment the intermediate network element is a multiplexer/switch, mux/switch, 90 and also comprises a TC (not illustrated). On receipt at the mux/switch the OTN frame is time stamped with the arrival time of the OTN overhead 88. The arrival time at the mux/switch is inserted into the OTN overhead, to form an updated PTP information 92. The OTN frame is transmitted across the mux/switch and is time stamped with the exit time of the OTN overhead. The TC then calculates the transit time of the OTN overhead across the mux/switch as the difference between the arrival time and the exit time. The transit time is added to the transit time across the mapper in the PTP information correction field, to form an updated PTP information 94.

The mux/switch generates a further carrier signal carrying the OTN frame to the second network element 100.

In this embodiment, the second network element is a demapper 100 and comprises a TC (not illustrated). On receipt at the demapper the OTN frame is time stamped with the arrival time of the OTN overhead 88. The arrival time at the demapper is inserted into the OTN overhead, to form an updated PTP information 102. The OTN frame is transmitted across the demapper and the PTP event message is extracted from the OTN payload 96. The PTP event message is time stamped with its exit time from the demapper. The TC then calculates the transit time of the PTP event message identifier across the demapper. The transit time is added to the sum of the transit times across the mapper and the mux/switch in the PTP information correction field, to form an updated PTP information 104.

The demapper extracts the ingress PTP event message from the OTN payload and updates the correction field of the ingress PTP event message with the accumulated transit times, to form an egress PTP event message 106.

Considering the OTN overhead, the PTP information 84 will be placed in a suitable number of overhead bytes which are not used for other purposes and which are therefore free. For example, the RES (Reserved Bytes) may be used, or the general communications channel 1, GCC1, or GCC2 or other bytes may be used if free and available.

For example, the RES bytes (ROW 2, COLUMNS 1 and 2 AND ROW 4, COLUMNS 9 to 14) provide up to 8 bytes per frame. An OTU2 frame is 12.191 μs in length giving 82027 frames per second. Considering 8 bytes (64 bits) this gives 5.25 Mbit/s of raw bandwidth. A typical IEEE 1588 implementation uses PTP event messages having a packet length of 128 bytes and a transmission rate of 20 packets/second. This would give a raw bandwidth of 20 kbit/sec. The IEEE 1588 transmission rate is less than 128 packets/second, giving a worst case raw bandwidth of 131 kbit/second per PTP event message flow.

In this embodiment, the PTP event message 82 is modified before it is inserted, in this example copied, into the OTN overhead 88. In particular, only the essential information, namely an identifier of the message plus the related timestamp, is inserted into the OTN overhead. 'PTP information' is used herein to mean either of a full PTP event message or this reduced PTP event message.

The packet length of the ingress PTP event message (128 bytes) may therefore be reduced a lot before being inserted into the OTN overhead and consequently the best case raw bandwidth will be less than 10 kbit/sec. As a result, in the OTU2 RES having an available bandwidth of 5.25 Mbit/s it is possible to insert a PTP event message from each of 40 PTP event message flows, each PTP event message flow having a bandwidth of 131 kbit in the worst case. In a typical case, a PTP event message from each of 262 flows, each having a bandwidth of 20 kbit, can be inserted in the OTU2 RES, and a PTP event message from each of more than 500 flows, each having a bandwidth of less than 10 kbit can be inserted in the OTU2 RES in the best case.

An OTU2 frame is able to contain up to 8 different optical channel data unit containers (ODU0), therefore inserting between 40 and 500, with 262 as a typical number, IEEE 1588 PTP event message flows is absolutely well acceptable.

OTU3 and OTU4 frames, and possibly higher level frames, may alternatively be used. Increasing the OTUn level means that the number of ODU0 containers increases but the frame period decreases in the same ratio (increasing the resulting available bandwidth in the same ratio as well). For example, an OTU3 is able to contain up to 32 ODU0 containers but its period is around 4 times shorter in comparison to OTU2 (3.035 μs) and the available bandwidth is 21.087 Mbit/s.

A network operator will be able to configure the number of RES bytes dedicated to this functionality, between 0 and 8, and therefore the maximum number of PTP event message flows which may be transported in a single OTU frame.

In order to place several PTP event message flows (each of them in the worst case of 128 bytes) inside a few RES bytes requires the use of multi-framing and a method of defining the multi-frame alignment. OTN multiframing methods will be well known to the person skilled in the art, any of which may be used for this purpose.

Unlike the prior art approach of directly implementing transparent clock operations on a client signal, updating the client signal in every network element, the method of this embodiment comprises extracting the PTP information carried by the client signal (e.g. an IEEE 1588 PTP event message carried over Gbit/s client) at the first network element (the 'mapper') and inserting it into the OTN overhead. From this point onwards each network element calculates the transit time across itself and updates PTP information correction field. The OTN overhead may be the optical transport unit, OTU, overhead or the OSC overhead. At the last network element (the 'demapper'), the accumulated transit time in the PTP information correction field is used to modify the correction field of the outgoing PTP event message.

The method described in this embodiment uses an transparent clock function based on the "End-to-end" Transparent clock, as defined in the IEEE 1588 Standard, but it will be appreciated by the person skilled in the art that a "Peer-to-peer" Transparent Clock function based on that defined in the IEEE 1588 Standard may alternatively be used. The benefit in implementing method described in this embodiment with the transparent clock function is to significantly simplify the distribution of clock synchronisation information.

In order to correct for potential asymmetries due to an optical communications network including DCF, as well as possible fiber length asymmetries, the OSC overhead may alternatively be used. If this is not acceptable due to standardization issues, asymmetries due to fiber length and DCF may be addressed by alternative methods.

The combination of use of the OTN overhead for PTP event message transport and the implementation of TC in each network element may overcome the single-operator limitation and may enable network operators to achieve the best final quality with a relative simple and cost-effective approach. The method of this embodiment may also minimize OTN overhead redefinitions and changes.

Figure 12:
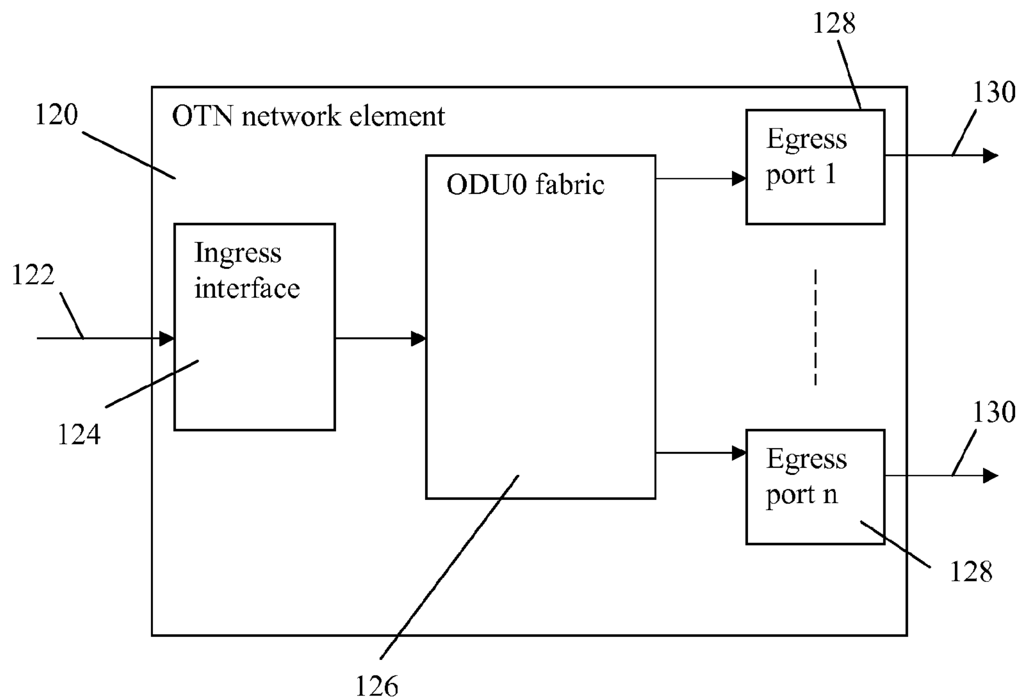
FIG. 12 is a diagrammatic representation of an OTN node for use with a method of distributing clock synchronization information within an optical communications network according to a seventh embodiment of the invention.
Figure 13:
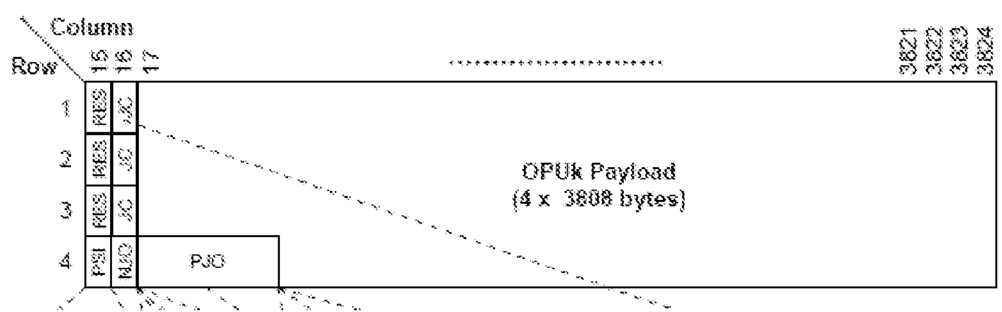
FIG. 13 is a diagrammatic representation of the optical data channel unit, ODU0, overhead.

Referring to FIGS. 12 and 13, a seventh embodiment of the invention provides a method of distributing clock synchronization information within an optical communications network which is similar to the method of the previous embodiment, with the following modifications.

In this embodiment, the method is for use with OTN network elements 120 which comprise an ODU0 switching fabric 126 and the OTN overhead is an ODU0 overhead. The ingress PTP event message 122 is received at an ingress interface 124 and time stamped. The PTP event message identifier is inserted into an ODU0 overhead, as shown in FIG. 13, together with the arrival time, and the PTP event message is inserted into an ODU0 payload container.

The PTP event message identifier is inserted into an ODU0 overhead at first network element ('mapper' 80) by either moving the PTP event message identifier from the ingress PTP event message and inserting it into the ODU0 overhead or by copying the PTP even message identifier and inserting the copy into the ODU0 overhead. Copying optimizes the required hardware in the second network element ('demapper' 100). Copying also provides the advantage that the need to overwrite some fields and not to add them to the egress PTP event message will mean that there are no bandwidth variations and therefore no need for schedulers/traffic managers at the second network element, which would result in additional costs and impairing and unavoidable delay variations. The ODU0 is forwarded towards the ODU0 switching fabric 126.

At the intermediate network node ('mux/switch' 90), the PTP information 86 in the OTN overhead received from the mapper is copied into a new ODU0 overhead before forwarding the new ODU0 overhead to the ODU0 switching fabric. The PTP information is copied into a new ODU0 overhead because the ODU0 overhead received from the mapper is terminated at the mux/switch.

The method comprises configuring each ODU0 switching fabric 126 to cross-connect the ODU0 payload container with its ODU0 overhead, to thereby cross-connect the PTP event message towards a desired egress port 128 of the respective network element. At the respective egress port the ODU0 overhead and payload are compiled into an ODU frame and a client signal 130 carrying the ODU frame is generated and transmitted.

The emerging trend in communications networks is to use hybrid packet switching fabrics to implement modern telecommunication network elements for costs reasons because packet switching devices are becoming increasingly cheaper on account of the wide spread of ethernet/IP. As a consequence the ODU containers are always packetized (segmented) before the switching fabric and reassembled after the switching fabric. A number of bytes may therefore be added to each ODU0 before segmenting it towards the ODU switching fabric.

Figure 14:
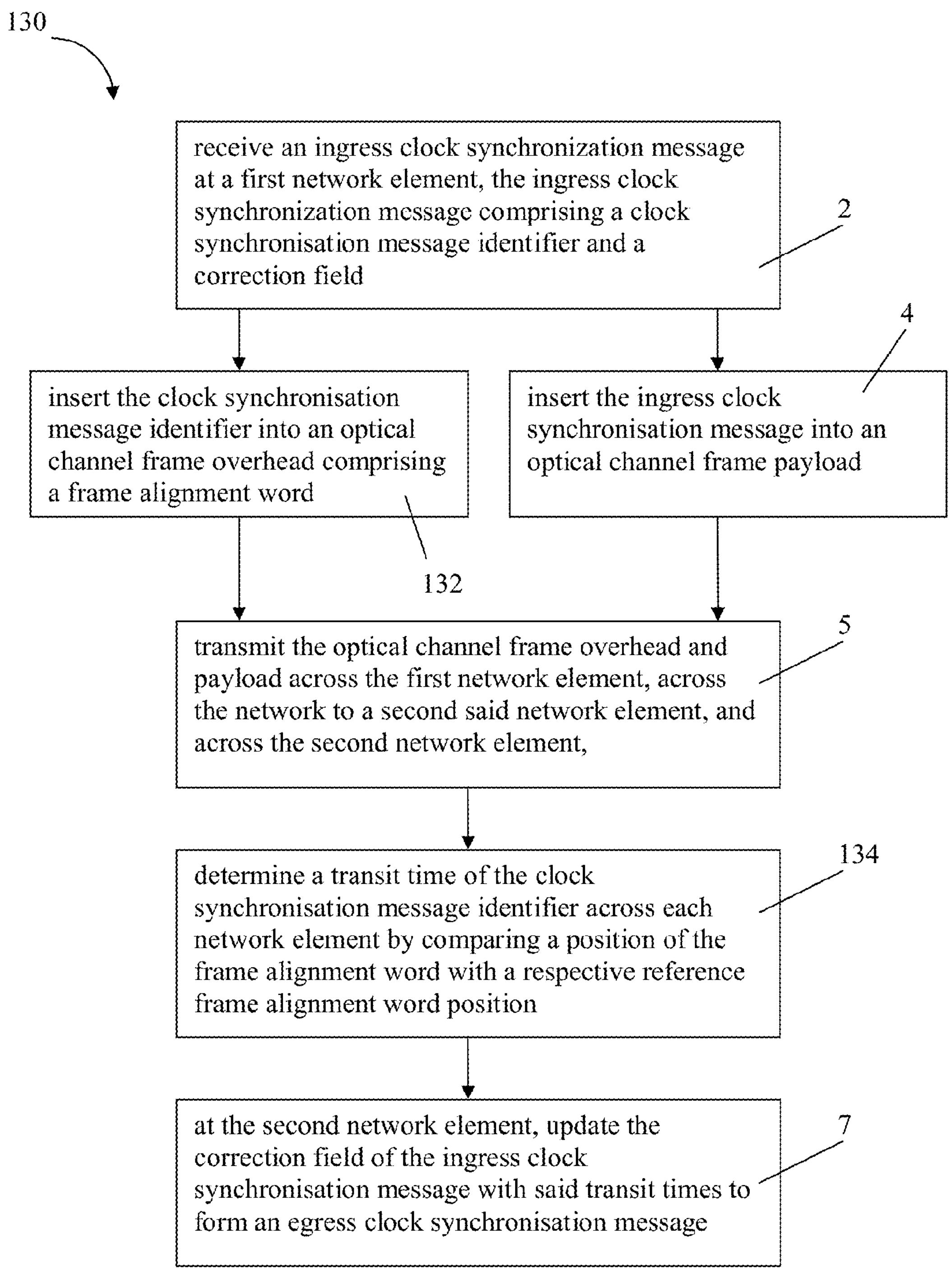
FIG. 14 shows the steps of a method of distributing clock synchronization information within an optical communications network according to an eighth embodiment of the invention.

FIG. 14 shows the steps of a method 130 of distributing clock synchronization information within an optical communications network according to an eighth embodiment of the invention. The method 130 of this embodiment is similar to the method 1 of FIG. 2, with the following modifications. The same reference numbers are retained for corresponding features.

In this embodiment, the clock synchronisation message identifier is inserted into an optical channel frame overhead comprising a frame alignment word. In step c. each transit time is determined by comparing a position of the frame alignment word in the overhead with a respective reference frame alignment word position.

Figure 15:
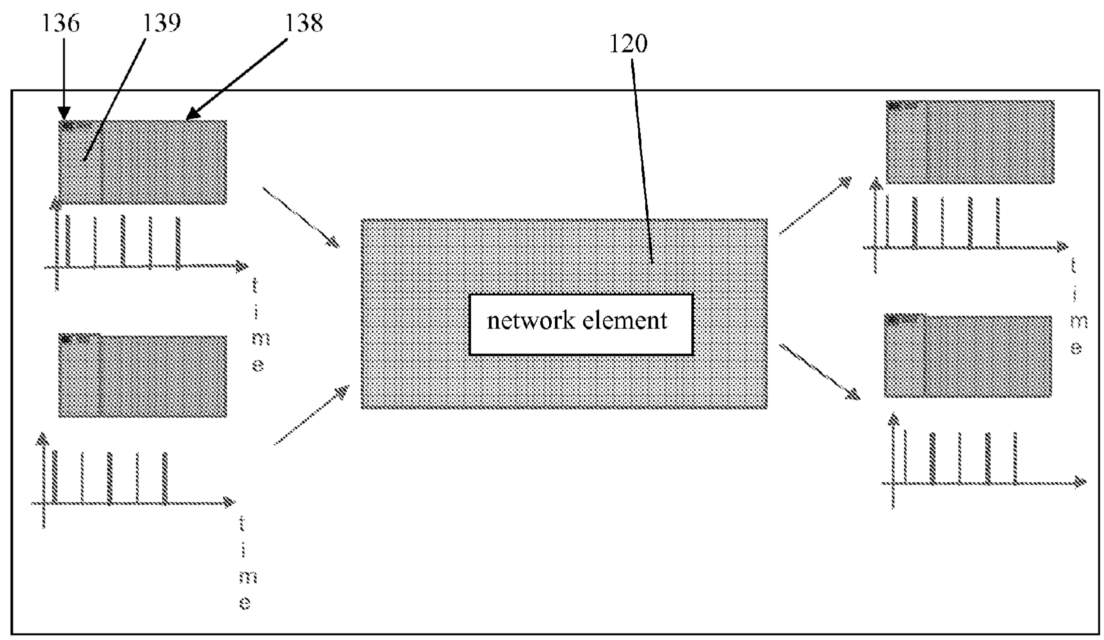
FIG. 15 is an illustration of ingress and egress frame alignment word, FAW, positions within an optical channel frame according to a method of distributing clock synchronization information within an optical communications network according to a ninth embodiment of the invention.
Figure 16:
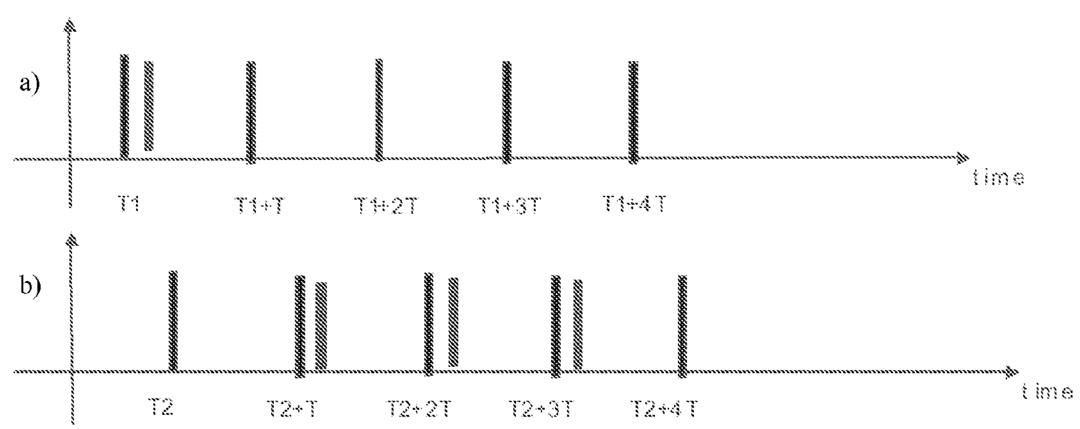
FIG. 16 is an illustration of a calculation of a transit time according to the method of the ninth embodiment of the invention.

Referring to FIGS. 15 and 16, a ninth embodiment of the invention provides a method of distributing clock synchronization information within an optical communications network which is similar to the method 130 of the previous embodiment, with the following modifications.

The arrival time of PTP information at each network element is periodic and the exit time of PTP information at each network element is also periodic. This allows some computational simplifications to be made to how the transit time is determined, as follows.

Each optical channel frame received by a network element is characterized by its frame alignment word, FAW, and the same is true for each egress optical channel frame. The position of the FAW 136 in an OTU frame 138 is shown in FIG. 15 as the first block inserted into the OTU frame header 139.

As shown in FIG. 16 *a*), the arrival time can only be T1 or T1+T or T1+2T, etc. The method comprises configuring the OTN network element 120 to verify the position of the ODU0 payload container received from the ODU switching fabric 126 as compared to a reference egress FAW position to determine if the exit time will be T2+T or T2+2T or T2+3T etc, as shown in FIG. 16 *b*). Therefore the transit time across the network element is given by:

$$T2-T1+nT$$

and the computation of n is a very simple task.

The method comprises storing a current FAW arrival time (T1, T1+T and so on) and updating the FAW arrival time when each new FAW is received. The method comprises storing a current FAW exit time (T2, T2+T and so on) and updating the FAW exit time when each new exit FAW is received.

The FAW arrival time is inserted in the PTP event message itself using the PTP RES bytes (4 bytes) or by appending them to the PTP event message. At the egress side, the PTP RES bytes provide the FAW arrival time and therefore allow the FAW exit time to be calculated as:

$$T2-T1+nT$$

The PTP event message correction field is 8 bytes. In the correction field the correction is given in nanoseconds and multiplied by 216. This allows a range from 2-16 ns to around 26 days. As will be appreciated by the person skilled in the art, neither of these values has any practical meaning as transit time across an OTN network element.

The time range can be modified by applying a multiplication factor, for example a 28 or 24 multiplying factor, to the received correction. In the first case, considering the four bytes RES area this gives a range from 2-8 ns to 33 ms and in the second case from 0.06 ns to 528 ms, both of which are more realistic.

The received channel frame period is not constant from port to port on the ingress interface 124 because it depends on the ingress (or egress) frequency of the PTP event message flow. This is because PTP event messages will be received from different network elements within a network and the network elements are asynchronous (the network elements have a nominal frequency and an acceptable variation about the nominal frequency which results in their being asynchronous).

Therefore the method comprises calculating the frame period for each ingress port (this is the difference between the time stamps of two consecutive FAWs) and the frame period for each egress port. Each ingress port and egress port has a clock, and the ingress and egress clocks are affected by jitter (high frequency sinusoidal jitter has a zero mean value and therefore does not significantly affect the calculation) and slow wander or frequency drift (that can result in a bigger impairment). As a consequence the different frame periods (T3, T4) are updated from time to time. The update rate is calculated considering the expected frequency drift, the network design, and the final PTP quality targets, or can be dynamically adapted according to the results.

Figure 17:
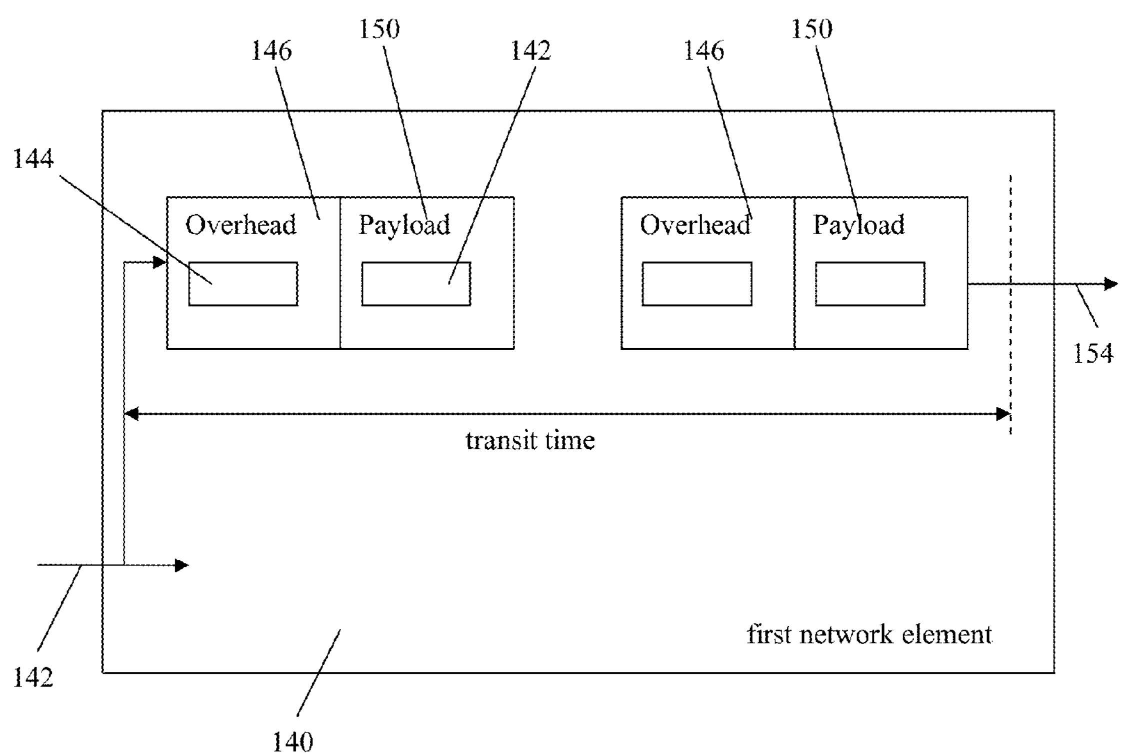
FIG. 17 is a diagrammatic representation of a first optical communications network element according to a tenth embodiment of the invention.

A first optical communications network element 140 according to a tenth embodiment of the invention is shown in FIG. 17.

The first optical communications network element 140 is configured to receive an ingress clock synchronization message 142 comprising a clock synchronisation message identifier and a correction field.

The first optical communications network element 140 is configured to:

insert the clock synchronisation message identifier into an optical channel frame overhead 146;

insert the ingress clock synchronisation message 142 into an optical channel frame payload 150;

transmit the optical channel frame overhead and payload across the first network element;

determine a transit time of the clock synchronisation message identifier across the first optical communications network element; and generate and transmit an optical signal 154 carrying the optical channel frame and the optical channel frame payload.

Figure 18:
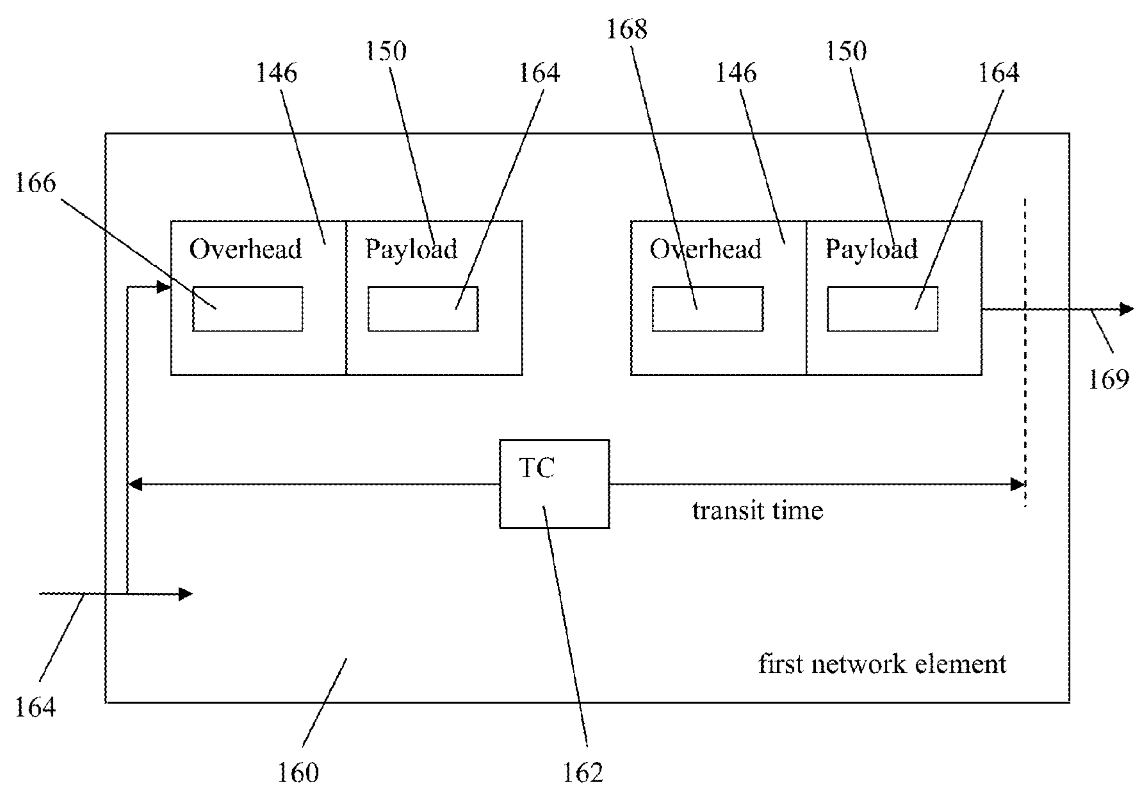
FIG. 18 is a diagrammatic representation of a first optical communications network element according to an eleventh embodiment of the invention.

A first optical communications network element 160 according to an eleventh embodiment of the invention is shown in FIG. 18. The first optical communications network element 160 of this embodiment is similar to the first optical communications network element 140 shown in FIG. 17, with the following modifications. The same reference numbers are retained for corresponding features.

In this embodiment, the clock synchronisation message is a PTP event message 164 and first optical communications network element 160 comprises an end-to-end transparent clock function, TC, 162.

The first optical communications network element 160 is additionally configured to insert an indication of an arrival time of the PTP event message into the optical channel frame overhead 146, to provide PTP information 166 in the optical channel frame overhead. The first optical communications network element 160 is configured to insert the transit time into a PTP information correction field in the optical channel frame overhead, to update the PTP information 168.

The first optical communications network element 160 is configured to compile an optical channel frame comprising the optical channel frame overhead 146 and the optical channel frame payload 150 and to generate and transmit an optical signal 169 carrying the optical channel frame.

A twelfth embodiment of the invention provides a first optical communications network element which is similar to the second optical communications network element 140 shown in FIG. 17 and which will be described with reference to that Figure.

In this embodiment, the optical channel frame overhead comprises a frame alignment word. The first network element 140 is configured to determine the transit time by comparing a position of the frame alignment word with a reference frame alignment word position.

In further embodiments of the invention the first optical communications network element 140 is configured respectively to implement the steps of the methods described above in relation to FIGS. 5 to 16 which are carried out at the first optical communications network element.

Figure 19:
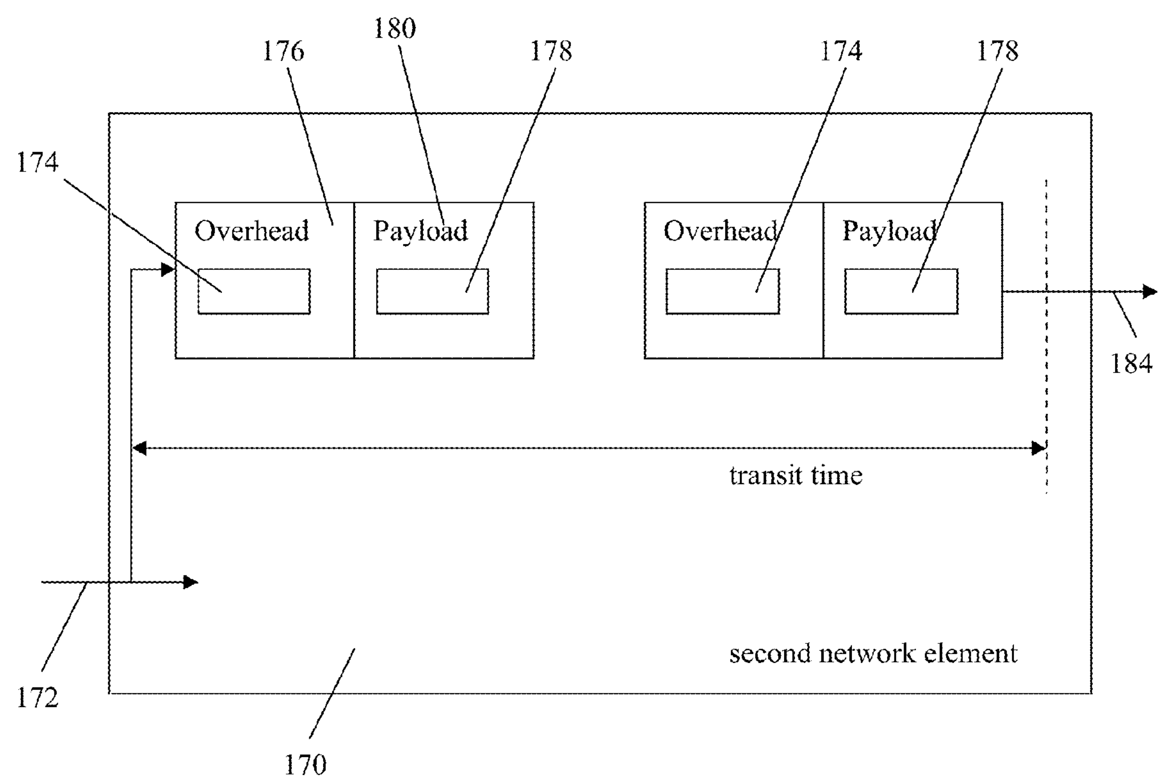
FIG. 19 is a diagrammatic representation of a second optical communications network element according to a thirteenth embodiment of the invention.

A second optical communications network element 170 according to a thirteenth embodiment of the invention is shown in FIG. 19.

The second optical communications network element 170 is configured to receive a carrier signal 172 carrying an optical channel frame overhead 176 and an optical channel frame payload 180 from an optical communications network. The optical channel frame overhead comprises a clock synchronisation message identifier 174 and the optical channel frame payload comprises an ingress clock synchronisation message 178. The clock synchronisation message comprises the clock synchronisation message identifier and a correction field.

The second network element 170 is configured to:

i. transmit the optical channel frame across the second network element and determine a transit time of the clock synchronisation message identifier across the second network element;

ii. obtain a transit time of the clock synchronisation message identifier across at least one other network element in said optical communications network; and iii. update the correction field of the ingress clock synchronisation message with a sum of said transit times to form an egress clock synchronisation message 184.

A fourteenth embodiment of the invention provides a second optical communications network element which is similar to the second optical communications network element 170 shown in FIG. 19 and which will be described with reference to that Figure.

In this embodiment, the optical channel frame overhead further comprises the transit time of the clock synchronisation message identifier across said at least one other network element.

The second optical communications network element 170 is configured to, in step ii., obtain the transit time of the clock synchronisation message identifier across the at least one other network element from the optical channel frame overhead. The second network element is configured to, in step iii., extract the ingress clock synchronisation message from the optical channel frame payload and to then update the correction field with a sum of the said transit times to form the egress clock synchronisation message 184.

Figure 20:
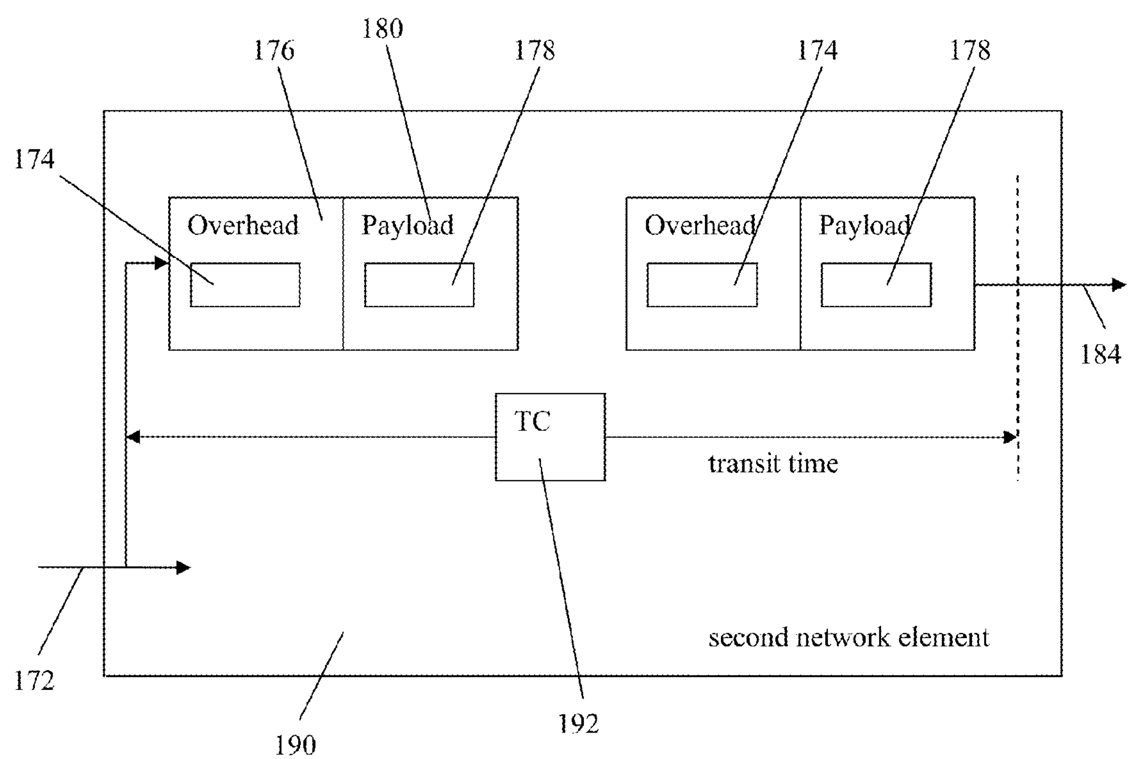
FIG. 20 is a diagrammatic representation of a second optical communications network element according to a sixteenth embodiment of the invention.
Figure 21:
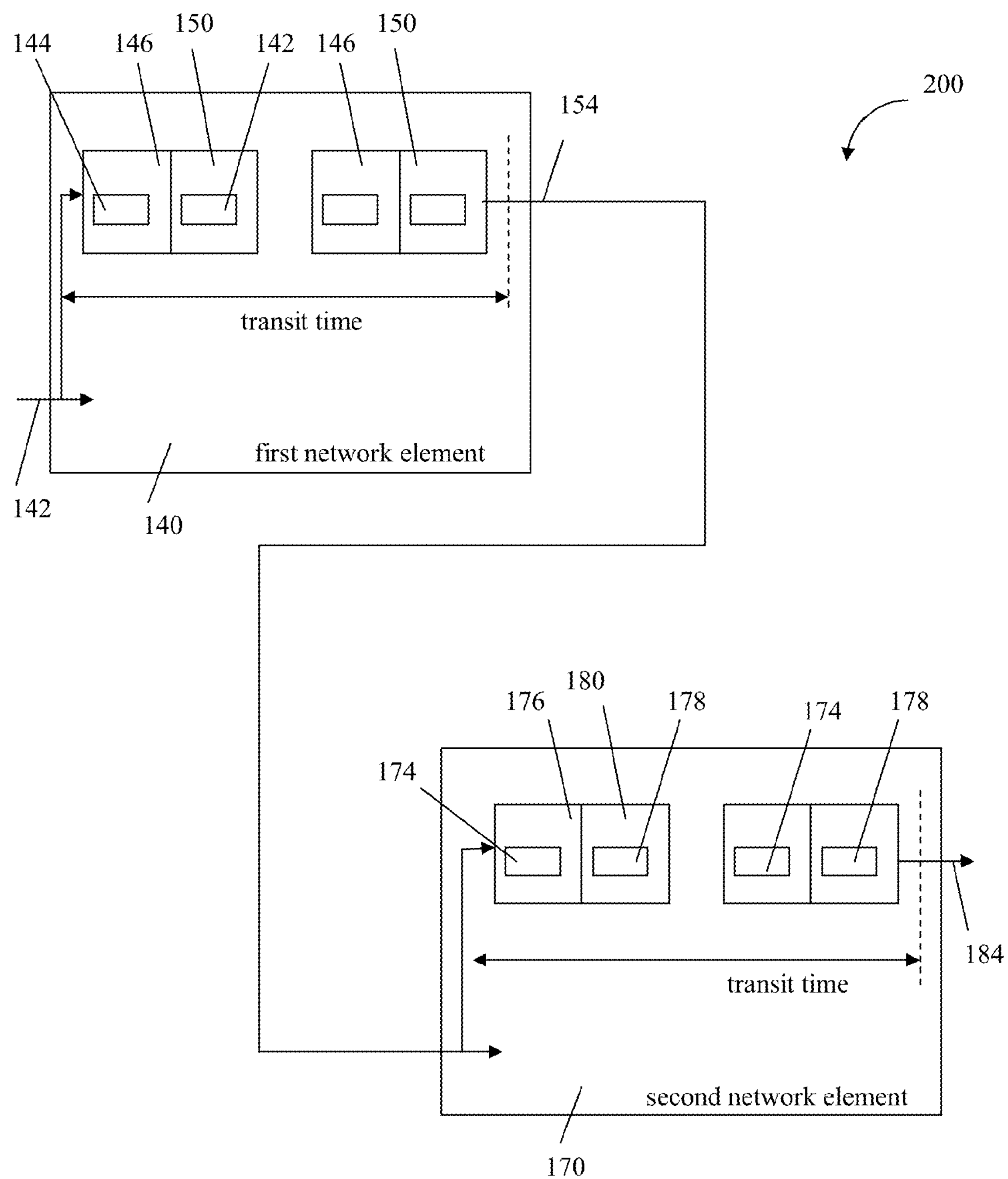
FIG. 21 is a diagrammatic representation of an optical communications network according to a seventeenth embodiment of the invention.

A second optical communications network element 190 according to a sixteenth embodiment of the invention is shown in FIG. 20. The second optical communications network element 190 of this embodiment is similar to the second optical communications network element 170 shown in FIG. 19, with the following modifications. The same reference numbers are retained for corresponding features.

In this embodiment, the clock synchronisation message is a PTP event message. The second optical communications network element comprises an end-to-end TC 192.

A sixteenth embodiment of the invention provides a second optical communications network element which is similar to the second optical communications network element 170 shown in FIG. 19 and which will be described with reference to that Figure.

In this embodiment, the optical channel frame overhead comprises a frame alignment word. The second network element 170 is configured to determine the transit time by comparing a position of the frame alignment word with a reference frame alignment word position.

In further embodiments of the invention the second optical communications network element 170 is configured respectively to implement the steps of the methods described above in relation to FIGS. 5 to 16 which are carried out at the second optical communications network element.

A seventeenth embodiment of the invention provides an optical communications network a first optical communications network element 140 and a second optical communications network element 170.

It will be appreciated that the first optical communications network element 160 and/or the second optical communications network element 160 may alternatively be used.

What is claimed is:

1. A method of distributing clock synchronization information within an optical communications network including a plurality of network elements, the method comprising:

receiving an ingress clock synchronization message at a first network element, the ingress clock synchronization message including a clock synchronisation message identifier and a correction field;

inserting the clock synchronisation message identifier into an optical channel frame overhead and inserting the ingress clock synchronisation message into an optical channel frame payload;

transmitting the optical channel frame overhead and the optical channel frame payload across the first network element, across the network to a second network element, and across the second network element, and determining a transit time of the clock synchronisation message identifier across each of the network elements; and at the second network element, updating the correction field of the ingress clock synchronisation message with said transit times to form an egress clock synchronisation message.

2. The method of claim 1, wherein inserting the clock synchronisation message further comprises inserting an indication of an arrival time of the clock synchronisation message into the optical channel frame overhead, wherein transmitting the optical channel frame overhead and the optical channel frame payload further comprises determining a transit time of the clock synchronisation message identifier across the first network element, inserting the transit time into the optical channel frame overhead, compiling an optical channel frame comprising the optical channel frame overhead and the optical channel frame payload, transmitting the optical channel frame from the first network element to the second network element, receiving the optical channel frame and obtaining the transit time at the second network element from the optical channel frame overhead, and transmitting the optical channel frame across the second network element and determining a transit time of the clock synchronisation message identifier across the second network element, and wherein updating the correction field further comprises extracting the ingress clock synchronisation message from the optical channel frame payload and updating the correction field with a sum of the respective transit times across each said network element to form the egress clock synchronisation message.

3. The method of claim 2, wherein transmitting the optical channel frame further comprises:

transmitting the optical channel frame from the first network element to an intermediate network element;

at the intermediate network element, determining a transit time of the clock synchronisation message identifier across the intermediate network element and adding said transit time to the transit time in the optical channel frame overhead; and transmitting the optical channel frame from the intermediate network element to the second network element.

4. The method of claim 1, wherein the clock synchronisation message is a precision timing protocol event message.

5. The method of claim 1, further comprising:

determining a link delay between each adjacent pair of network elements between which the optical channel frame is transmitted.

6. The method of claim 1, wherein the optical channel frame overhead comprises a frame alignment word, and wherein transmitting the optical channel frame overhead and optical channel frame payload further comprises determining each transit time by comparing a position of the frame alignment word with a respective reference frame alignment word position.

7. The method of claim 1, wherein the optical communications network is an optical transport network and the optical channel frame overhead is any one of an optical transport unit frame overhead and an optical supervisory channel frame overhead.

8. A non-transitory computer-readable storage medium, having instructions stored therein, which when executed, cause a computer to perform a set of operations comprising:

receiving an ingress clock synchronization message at a first network element, the ingress clock synchronization message including a clock synchronisation message identifier and a correction field;

inserting the clock synchronisation message identifier into an optical channel frame overhead and inserting the ingress clock synchronisation message into an optical channel frame payload;

transmitting the optical channel frame overhead and the optical channel frame payload across the first network element, across the network to a second network element, and across the second network element, and determining a transit time of the clock synchronisation message identifier across each of the network elements; and at the second network element, updating the correction field of the ingress clock synchronisation message with said transit times to form an egress clock synchronisation message.

9. A first optical communications network element configured to receive an ingress clock synchronization message including a clock synchronisation message identifier and a correction field, the first optical communications network element comprising:

a processor configured to insert the clock synchronisation message identifier into an optical channel frame overhead, insert the ingress clock synchronisation message into an optical channel frame payload, transmit the optical channel frame overhead and payload across the first network element, determine a transit time of the clock synchronisation message identifier across the first optical communications network element, and generate and transmit an optical signal carrying the optical channel frame and the optical channel frame payload.

10. The first optical communications network element of claim 9, wherein the processor of the first optical communications network element is further configured to insert an indication of an arrival time of the clock synchronisation message into the optical channel frame overhead, insert the transit time into the optical channel frame overhead, compile an optical channel frame comprising the optical channel frame overhead and the optical channel frame payload, and generate and transmit an optical signal carrying the optical channel frame.

11. The first optical communications network element of claim 9, wherein the clock synchronisation message is a precision timing protocol event message.

12. The first optical communications network element of claim 9, wherein the first optical communications network element further comprises any one of an end-to-end transparent clock function based on the end-to-end transparent clock function defined in the IEEE 1588 Standard and a peer-to-peer transparent clock function based on the peer-to-peer transparent clock function defined in the IEEE 1588 Standard.

13. The first optical communications network element of claim 9, wherein the optical channel frame overhead includes a frame alignment word, and wherein first network optical communications network element is configured to determine the transit time by comparing a position of the frame alignment word with a reference frame alignment word position.

14. The first optical communications network element of claim 9, wherein the optical channel frame overhead is any one of an optical transport unit frame overhead and an optical supervisory channel frame overhead.

15. A second optical communications network element configured to receive an optical channel frame overhead and an optical channel frame payload from an optical communications network, the optical channel frame overhead including a clock synchronisation message identifier, and optical channel frame payload including an ingress clock synchronisation message including the clock synchronisation message identifier and a correction field, and the second network element comprising:

a processor configured to transmit the optical channel frame across the second network element and determine a transit time of the clock synchronisation message identifier across the second network element, to obtain a transit time of the clock synchronisation message identifier across at least one other network element in said optical communications network, and to update the correction field of the ingress clock synchronisation message with a sum of said transit times to form an egress clock synchronisation message.

16. The second optical communications network element of claim 15, wherein the optical channel frame overhead further includes the transit time of the clock synchronisation message identifier across at least one other network element and the second optical communications network element is configured to obtain the transit time of the clock synchronisation message identifier across the at least one other network element from the optical channel frame overhead, and the second network element is configured to extract the ingress clock synchronisation message from the optical channel frame payload and to then update the correction field with a sum of the transit times to form the egress clock synchronisation message.

17. The second optical communications network element of claim 15, wherein the clock synchronisation message is a precision timing protocol event message.

18. The second optical communications network element of claim 15, wherein the second optical communications network element further comprises any one of an end-to-end transparent clock function based on the end-to-end transparent clock function defined in the IEEE 1588 Standard and a peer-to-peer transparent clock function based on the peer-to-peer transparent clock function defined in the IEEE 1588 Standard.

19. The second optical communications network element of claim 15, wherein the optical channel frame overhead includes a frame alignment word and wherein second network element is configured to determine the transit time by comparing a position of the frame alignment word with a reference frame alignment word position.

20. An optical communications network comprising:

a first optical communications network element configured to receive an ingress clock synchronization message including a clock synchronization message identifier and a correction field, the first optical communications network element including a processor configured to insert the clock synchronisation message identifier into an optical channel frame overhead, insert the ingress clock synchronisation message into an optical channel frame payload, transmit the optical channel frame overhead and payload across the first network element, determine a transit time of the clock synchronisation message identifier across the first optical communications network element, and generate and transmit an optical signal carrying the optical channel frame and the optical channel frame payload; and a second optical communications network element communicatively coupled to the first optical communications network element, the second optical communications network element configured to receive an optical channel frame overhead and an optical channel frame payload from an optical communications network, the optical channel frame overhead including a clock synchronisation message identifier, and optical channel frame payload including an ingress clock synchronisation message including the clock synchronisation message identifier and a correction field, and the second network element including a processor configured to transmit the optical channel frame across the second network element and determine a transit time of the clock synchronisation message identifier across the second network element, to obtain a transit time of the clock synchronisation message identifier across at least one other network element in said optical communications network, and to update the correction field of the ingress clock synchronisation message with a sum of said transit times to form an egress clock synchronisation message.

* * * * *